(12) United States Patent
Turner

(10) Patent No.: US 7,007,903 B2
(45) Date of Patent: Mar. 7, 2006

(54) MODULAR STRUCTURES AND CONNECTOR ASSEMBLY APPARATUS

(76) Inventor: Jerry Randall Turner, P.O. Box 1613, Mt Juliet, TN (US) 37121

( * ) Notice: Subject to any disclaimer, the term of this patent is extended or adjusted under 35 U.S.C. 154(b) by 0 days.

(21) Appl. No.: 10/403,641

(22) Filed: Mar. 31, 2003

(65) Prior Publication Data

US 2004/0098943 A1 May 27, 2004

Related U.S. Application Data

(60) Provisional application No. 60/380,465, filed on May 15, 2002.

(51) Int. Cl.
A47B 96/06 (2006.01)
(52) U.S. Cl. .............................. 248/220.21; 248/224.51
(58) Field of Classification Search ........... 248/220.21, 248/223.41, 300, 220.22, 224.51, 224.61, 248/475.1
See application file for complete search history.

(56) References Cited

U.S. PATENT DOCUMENTS

| | | | | |
|---|---|---|---|---|
| 594,035 A | * | 11/1897 | Reichert ..................... 248/243 |
| 1,356,745 A | | 10/1920 | Schwartz | |
| 1,787,734 A | * | 1/1931 | Rowling ........................ 248/73 |
| 2,173,159 A | * | 9/1939 | Ewan ..................... 248/224.51 |
| 2,210,235 A | * | 8/1940 | Filbert .................... 248/224.51 |
| 2,588,009 A | * | 3/1952 | Jones .......................... 248/489 |
| 3,840,261 A | * | 10/1974 | Fulkerson et al. ............. 294/55 |
| 3,915,189 A | * | 10/1975 | Holbrook et al. ........... 137/205 |
| 4,028,858 A | | 6/1977 | Rehbein | |
| 4,176,580 A | * | 12/1979 | Gallegos ....................... 84/327 |
| 4,228,982 A | * | 10/1980 | Sellera ........................ 248/467 |
| 4,566,243 A | | 1/1986 | Dahlin | |
| 4,620,736 A | * | 11/1986 | Shanks ........................ 239/116 |
| 5,035,389 A | * | 7/1991 | Wang .................... 248/224.51 |
| 5,165,213 A | | 11/1992 | Finch et al. | |
| 5,240,213 A | * | 8/1993 | Horcher ................. 248/223.41 |
| 5,348,778 A | | 9/1994 | Knipp et al. | |
| 5,356,038 A | * | 10/1994 | Banks ......................... 222/105 |
| 5,433,416 A | * | 7/1995 | Johnson ................... 248/475.1 |
| 5,435,511 A | * | 7/1995 | Hsu ......................... 248/206.3 |
| 5,566,917 A | | 10/1996 | Wu | |
| 5,707,033 A | * | 1/1998 | Holt et al. ............. 248/225.11 |
| 5,758,988 A | | 6/1998 | Theodorou | |
| 5,802,798 A | | 9/1998 | Martens | |
| 6,082,687 A | * | 7/2000 | Kump et al. ........... 248/220.41 |
| 6,227,514 B1 | | 5/2001 | Williams | |
| 6,481,679 B1 | * | 11/2002 | Bennett et al. ......... 248/224.51 |
| 2003/0038222 A1 | * | 2/2003 | Holmes .................... 248/475.1 |

* cited by examiner

*Primary Examiner*—Ramon O Ramirez
(74) *Attorney, Agent, or Firm*—David Douglas Winters

(57) ABSTRACT

Disclosed is a modular, knock down structure construction system illustrated by three structures, each having connecting portions detachably secured to one another by Trapezoidal Quick Slide Connector Assemblies, also disclosed, that enable a user to erect, without tools, a pre-designed structure.

Additionally disclosed is a manufacturing apparatus for accurately and efficiently mounting connector assemblies on structural parts for later assembly.

15 Claims, 10 Drawing Sheets

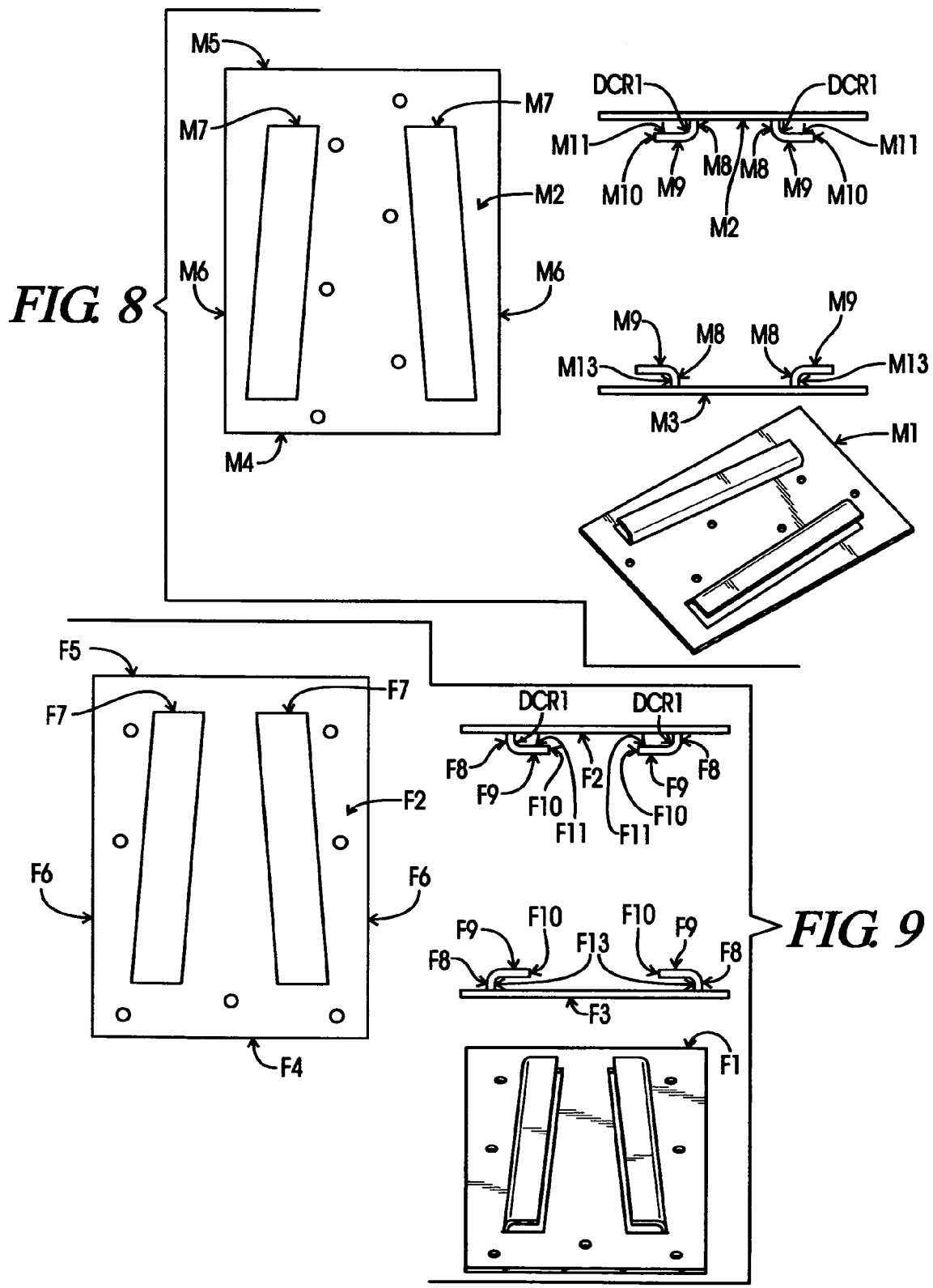

MODULAR STRUCTURES AND CONNECTOR ASSEMBLY APPARATUS

CROSS-REFERENCE TO RELATED APPLICATIONS

This application relates to and claims the benefit of U.S. Provisional Application No. 60/380,465 filed 15 May 2002 by Mr. Jerry R. Turner with respect to the disclosed trapezoidal quick slide connectors and modular knock down structure construction system for a residential deck system.

FEDERALLY SPONSORED RESEARCH

Not Applicable

INCORPORATION-BY-REFERENCE OF MATERIAL SUBMITTED ON A COMPACT DISK

Not Applicable

BACKGROUND OF THE INVENTION

1. Field of Invention

The field of the invention relates generally to connector assemblies used to construct appliances and structures, and more particularly to a sliding connector assembly for rigid construction of prefabricated structures.

2. Related Art

Various types of connector assemblies are known and used in construction of appliances and structures to provide releasable connections between one or more structural components. For example, pin and slot connectors have been used to connect deck blocks formed of strips of lumber of essentially equal length that are laterally disposed side by side. (Refer to U.S. Pat. No. 4,028,858 issued to Rehbein.) Hook and rail connectors have been used to construct modular knockdown structures. (See U.S. Pat. No. 5,758,988 issued to Theodorou.) V-shaped, slotted cross-brace connectors have been used to assemble plank grating for decking, flooring, or sub-flooring in which the V-shaped, slotted cross-braces are inserted through openings and rotated to an assembled position. (See U.S. Pat. No. 4,566,243 issued to Dahlin) Finally, trapezoid-shaped connector assemblies have been used to construct items such as bathroom fixtures, lamp brackets, and machine mounts as in U.S. Pat. No. 1,356,745 issued to Schwartz, U.S. Pat. No. 5,566,917 issued to Wu and U.S. Pat. No. 6,227,514 B1 issued to Williams.

Advantages of these aforesaid connectors include ease in manufacturing and ease of assembly for the structures in which they are used. Often the structures may be built with few tools. In such designs, the fits and tolerances are consistently and intentionally very loose. These loose fits and tolerances are what make the devices easier to manufacture and easier to fit together in assembling structures.

However, in each case, these necessarily loose fits and manufacturing tolerances associated with each connector create significant disadvantages. One such disadvantage is that in many of them, locking devices, such as pivot pins, grub screws, levers and the like, must be used to finally, securely and rigidly mate opposing connector parts together. Often, these locking devices must be installed using hand tools, a process that may be time-consuming and challenging for the manufacturer or for the do-it-yourself customer. Furthermore, the extra parts required may be lost or damaged during the shipping or assembly.

Another disadvantage is that the "looseness" inherent to these systems requires that construction systems using these connectors sacrifice strength, rigidity and resiliency to achieve ease of assembly. Such structures must be relatively imprecise in fitting together for assembly. They may not be dimensionally consistent at all joints. Therefore, the overall lengths that result from joining several structural components may vary unpredictably. This renders them unsuited for use in building complex structures such as residential decks, with rails and stairs, particularly those capable of repeated assembly and disassembly by hand without the use of tools.

Such connectors also tend to become progressively looser, weaker, and less rigid when subjected to loads and vibrations. Moreover, such structures cannot comply with strict construction safety standards as are demanded for residential use.

Further, although the connector parts and their associated locking devices may be designed with loose tolerances, they are still complex to manufacture and assemble, requiring secondary forming operations and assembly, and/or separate packing of multiple parts.

Finally, of the prior art, no trapezoidal slide based design is capable of rigidly joining faces of two opposing parts.

ADVANTAGES OF THE INVENTION DISCLOSED

The invention disclosed herein retains or even improves on the aforesaid advantages of the above connector devices and of the construction systems using them, and also overcomes all the aforesaid disadvantages.

The connector assembly described herein offers ease of manufacturing, and shipping in that it avoids costly secondary forming operations by requiring nothing of the manufacturing process beyond basic blank forming and piercing, and requires no assembly or packing of parts beyond the interchangeable, solid, one piece male and female connectors components.

The connector assembly invention disclosed herein also provides ease of assembly for the end user, requiring no tools at all. It uses no moveable part locking devices, thereby eliminating the need for pivot pins, grub screws, levers or other parts that may require manipulation and may be subject to loss or damage.

The disclosed connector assembly also retains the advantage of "looseness" in the first stages of assembly, making for easier use in the initial stage of fitting components together, but upon completion of assembly, connector components automatically lock tightly and precisely into place. Therefore, the overall structural dimensions produced are more consistent than was possible with previous art.

Additionally, the connector assembly disclosed herein does not suffer from the tendency to become more loose and weak with time and use as did earlier art. Instead, the connector components tend to become stronger and more securely joined as time passes and usage continues. This is because the assembly is so oriented as to use gravity and loads as means of fixing its components together. As vertical load is applied to the assembled components, they become more tightly and rigidly united. However, the connectors can be easily un-mated as necessary, making them particularly well adapted to use for "knock down" structures.

Finally, the disclosed connector assembly can easily join together wide flat surfaces, face to face, in contrast to previous art, that cannot.

BRIEF SUMMARY OF INVENTION

Disclosed herein, is a modular construction system (MCS) that includes a plurality of interchangeable parts, each formed of a rigid material such as, illustratively, metal, plastic, fibergalss, or wood. The design allows maximum flexibility in structure configuration and permits an individual to assemble, disassemble, and move a structure without the use of any tools.

A connector assembly for connecting a first part to a second part is also disclosed. The connector assembly includes a first male connector component to be rigidly mounted on the first part and a second female connector component to be rigidly mounted on the second part. The male and female connector components comprise flat trapezoids that can be mated by sliding the narrow end of the male connector component into the wide end of the female connector component.

Also disclosed is a manufacturing device for quickly and accurately positioning connector components taught in this patent for mounting on the modular construction parts that are to be connected.

BRIEF DESCRIPTION OF THE DRAWINGS

FIG. 8 is four views of a male connector component according to one embodiment.

FIG. 9 is four views of a female connector component according to one embodiment.

BRIEF DESCRIPTION OF THE DRAWINGS—LIST OF NUMBERED ITEMS (M1) male connector base plate
(M2) male connector front face
(M3) male connector back face
(M4) male connector top edge
(M5) male connector bottom edge
(M6) male connector side edge
(M7) male longitudinal connector vanes
(M8) male connector vane sill
(M9) male connector vane ledge
(M10) male ledge load bearing outer edge
(M11) male ledge load bearing inner surface
(M13) male sill load bearing outer surface
(M14) male connector vane offset
(F1) female connector base plate
(F2) female connector front face
(F3) female connector back face
(F4) female connector top edge
(F5) female connector bottom edge
(F6) female connector side edge
(F7) female longitudinal connector vanes
(F8) female connector vane sill
(F9) female connector vane ledge
(F10) female ledge load bearing inner edge
(F11) female ledge load bearing inner surface
(F13) female sill load bearing inner surface
(F14) width web
(F15) connectors in transit
(A1) alignment tab
(DCR1) dimension control radii curvature
(L1) intergral ledger
(P1) fastener portal
(R1) connectors without dimension control radii, in transit
(R2) connectors without dimension control radii, fully joined
(R1A) connectors without dimension control radii, in transit
(R2A) connectors without dimension control radii, fully joined
(S1) skewer connector component
(S2) skewer index tab

DETAILED DESCRIPTION

In the following descriptions when referring to connectors, the terms "top" and "bottom" are arbitrary and used only as a means of orienting the reader. In actual operation either end of the connector assembly may be used in the superior position, so long as the male and female components are matched in orientation.

Disclosed herein is a Modular Construction System (MCS) driven by multiple parameters. The resultant structure must, and does, comply with International Building Code standards for residential structures, where applicable. The resultant structure must be, and is, tight and rigid when fully assembled. The resultant structure must be, and is, quickly and easily assembled without tools. The connector assembly must be, and is, sufficiently precise to permit building extended and complex structures capable of disassembly and reassembly. Finally, the components must be, and are, capable of efficient manufacture to ensure their affordability.

As disclosed herein, an MCS includes a plurality of interchangeable parts, each formed of a rigid material such as metal, plastic, fiberglass, wood or the like. Illustratively, each interchangeable part may be formed of pressure-treated lumber, such as #1 grade Southern Yellow Pine. (See FIGS. 1, 2, 3, 4, 5, 6 and 7.)

Figure 1:
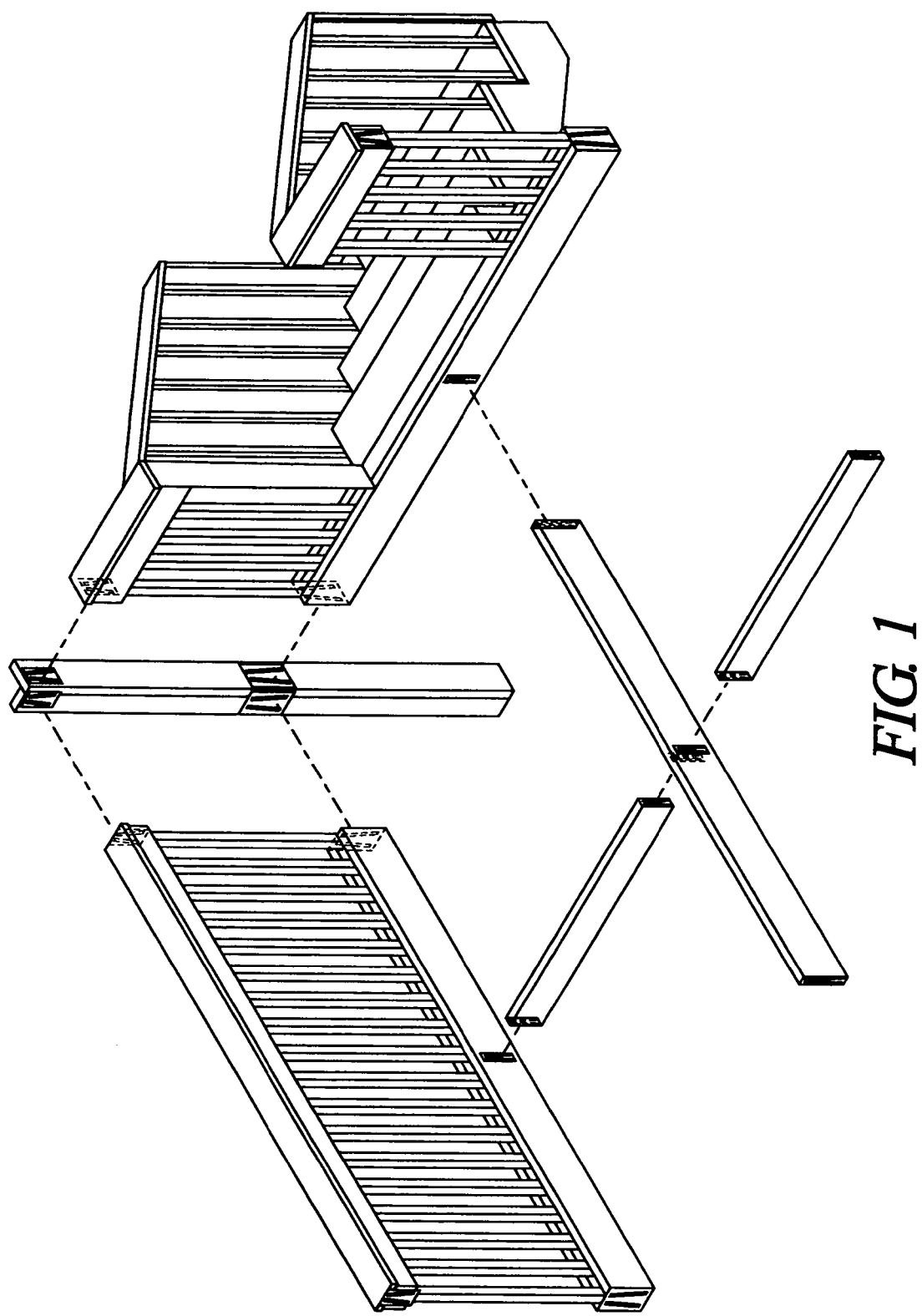
FIG. 1 is an exploded partial view of an MCS residential desk system excluding floor panels.
Figure 2:
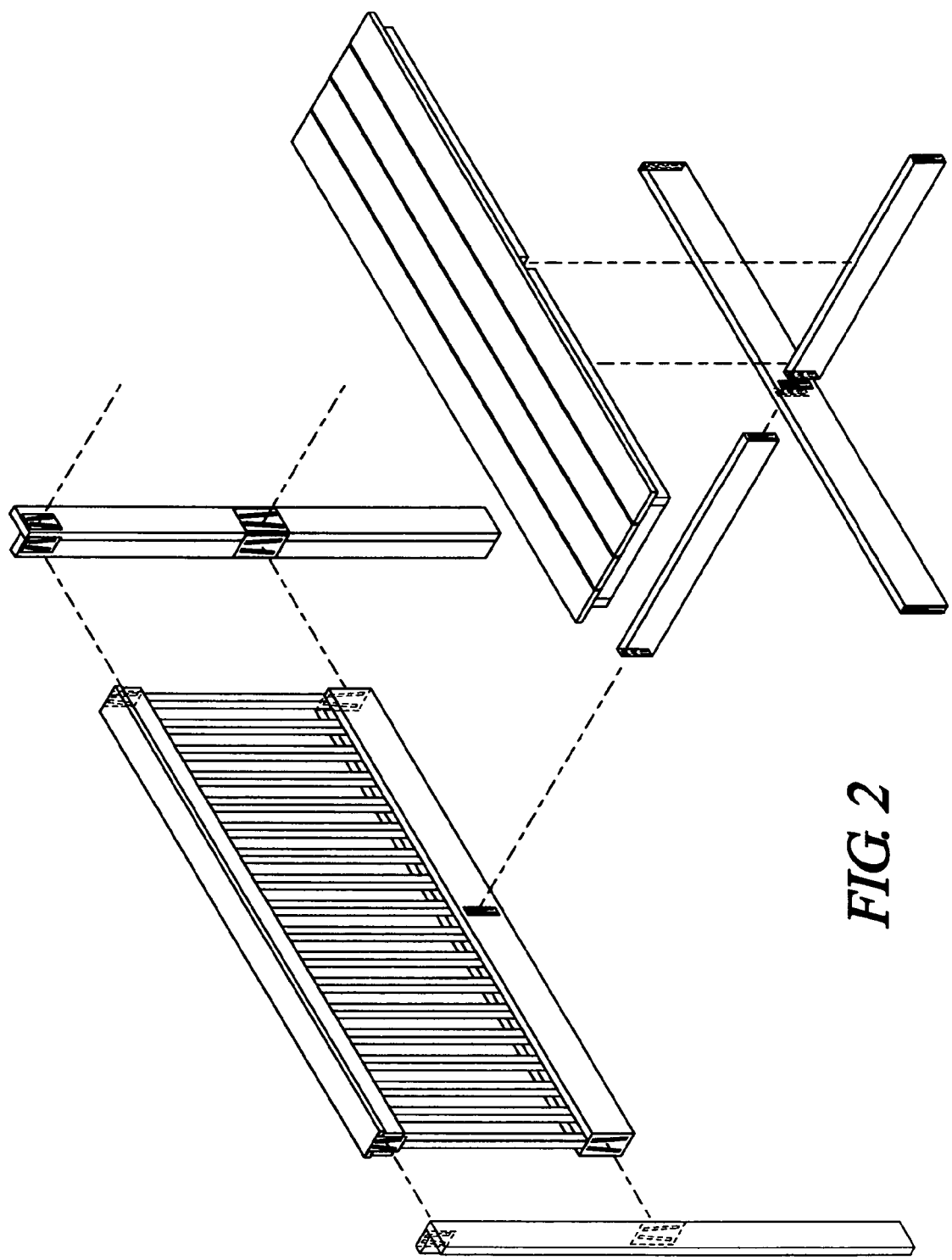
FIG. 2 is an exploded partial view of an MCS residential desk system excluding rail assembly.
Figure 3:
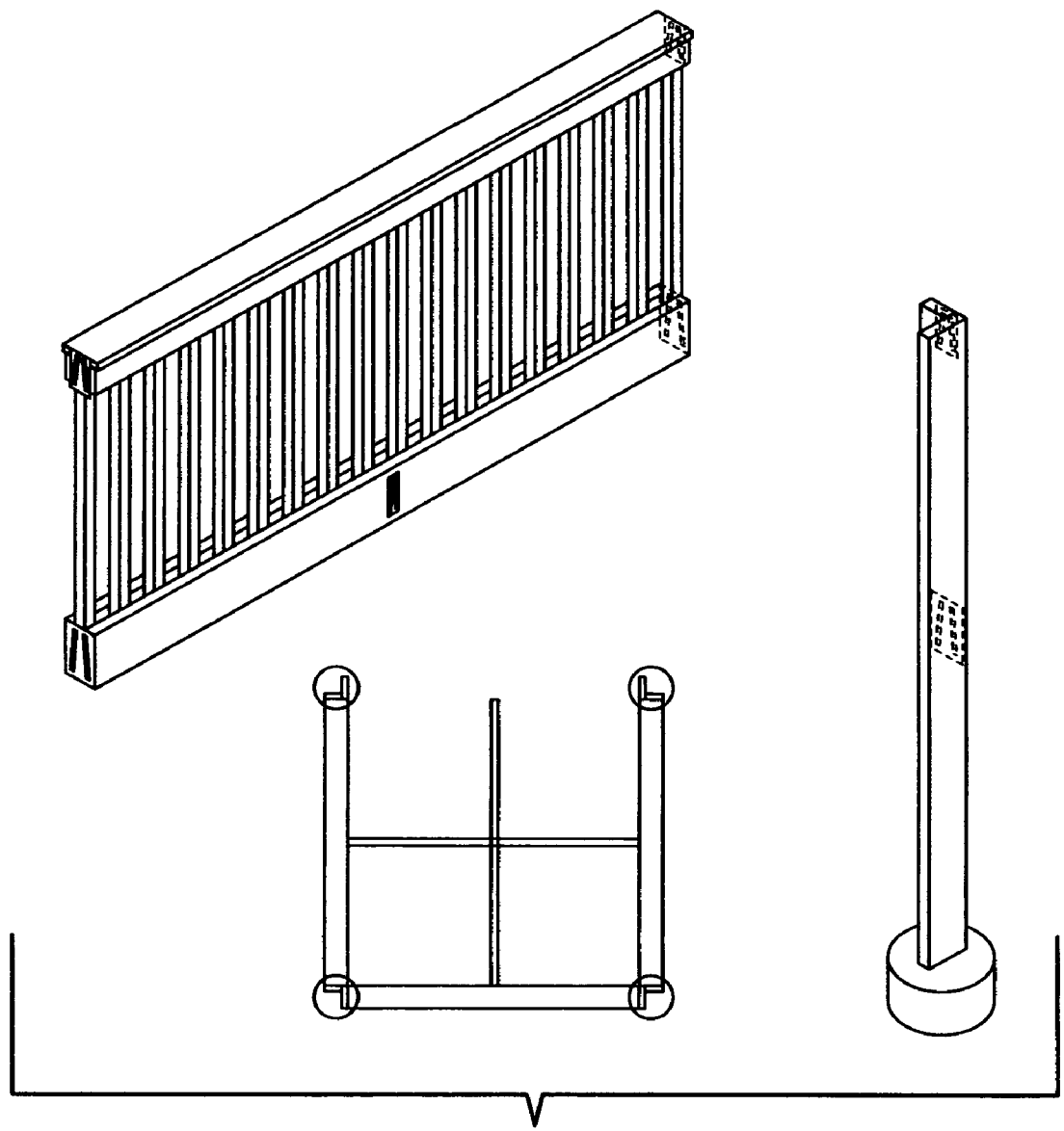
FIG. 3 is an exploded partial view of an MCS residential desk system showing how the rail assembly mounts in place.
Figure 5:
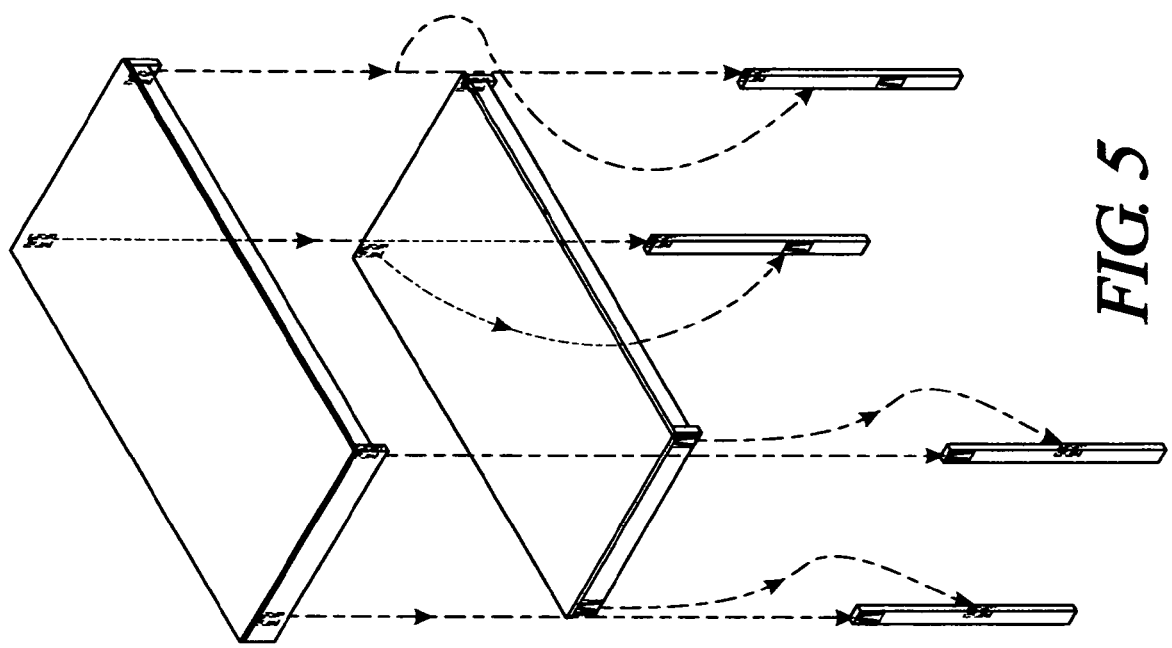
FIG. 5 is an exploded view of an MCS workbench.
Figure 4:
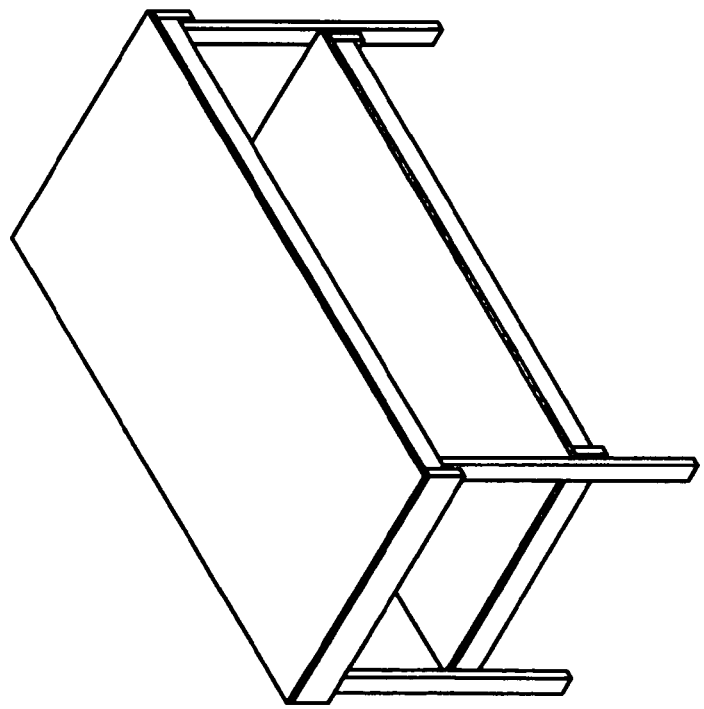
FIG. 4 is an assembled view of an MCS workbench.

Referring to FIGS. 1, 2 and 3, the MCS and connector assemblies allow a user to erect a modular structure, in one embodiment, a residential deck/porch system or RDS, which is sufficiently strong to comply with load-bearing requirements as set forth in the International Residential (IRC 2000) standards for residential structures. The International Code Counsel revises these standards periodically, but the invention for which patent application is applied herein is inherently capable of adjustment to meet any new strength standards that might be promulgated.

The design of this residential deck/porch system (RDS) allows maximum flexibility in structure configuration and permits an individual to assemble, disassemble, and move a structure without the use of tools.

In one embodiment, the RDS includes a unique 4×4 foot joist-grid system where no span between support posts exceeds 8 feet. This joist-grid system is easily assembled without the use of any tools into nearly any imaginable shape or size combination. Flooring panels are envisioned in either 2×8 foot or 4×4 foot sections, but other dimensions are also possible and contemplated. With these standard components, the sizes and shapes of the decks, porches, and other modular structures that can be manufactured are virtually endless. Illustratively, such structures may include square, rectangular and/or L-shaped designs. The RDS design includes IRC 2000 compliant handrail sections that are integrated into an assembled structure using an outside rim of exterior joists to provide additional structural rigidity. (See FIG. 1.)

Figure 6:
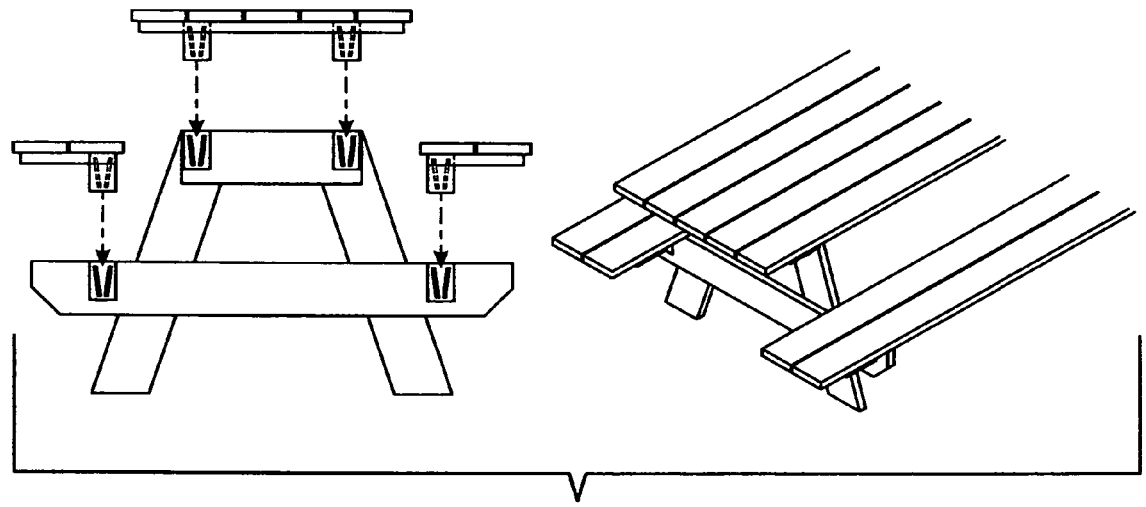
FIG. 6 is a partial view of an exploded end view of an MCS picnic table.
Figure 7:
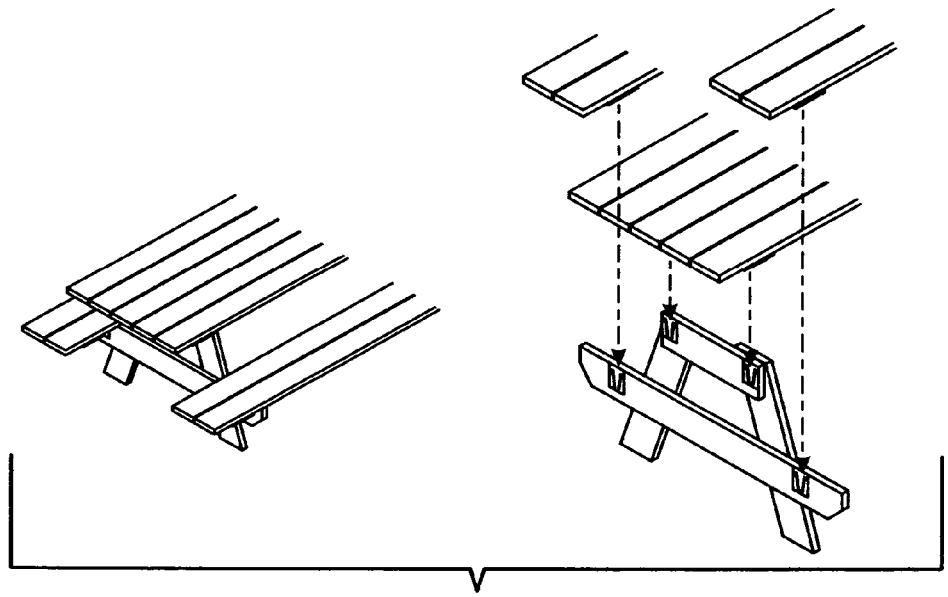
FIG. 7 is a partial view of a partial exploded quarter view of an MCS picnic table.

In use, various sizes of connector assemblies are attached to interchangeable parts at predetermined points of structural connection. By following instructions and/or assembly plans and diagrams, virtually any number of modular structures, including but not limited to stairs, decks, porches, furniture, buildings, and recreational structures, can be assembled without the use of tools. Disclosed in illustration are an MCS deck with stairs and rails (FIGS. 1, 2 and 3), an MCS workbench (FIGS. 4 and 5) and an MCS picnic table (FIGS. 6 and 7). Disassembly requires the use of a mallet or other such means of forcibly and suddenly applying solid blows to un-mate connector components. Thereafter, the interchangeable parts may be transported and/or reassembled as needed.

In illustration, to construct a deck or porch, the RDS is delivered to a job site in pieces and a joist-grid system is assembled. Deck flooring panels with substructures dimensionally compatible with the joist grid plan are then nested onto the resulting grid. The resulting deck or porch is at least as rigid and strong as a deck built using conventional construction techniques. Because the RDS and connector assemblies are designed for maximum flexibility of end user design, they may be used to assemble a deck surface in many residential applications, including but not limited to decks for manufactured homes, trailers, or recreational vehicles or for above ground swimming pools.

In the MCS workbench and the MCS picnic table embodiments, a workbench or table may be assembled that is strong and rigid. The workbench or table can be assembled, disassembled, transported, and reassembled without the use of tools and with no loss of structural rigidity. Moreover, the dimensional designs are such that all prefabricated structural components nest neatly for efficient packaging and transport.

A Trapezoidal Quick Slide Connector assembly for connecting a first part to a second part is also disclosed, hereinafter referred to as a "Connector Assembly." (See FIGS. 8, 9, 10, 11, 12, 13, 14, 15, and 16.) The connector assembly includes a first male connector component to be rigidly mounted on the first part and a second female connector component to be rigidly mounted on the second part. The male and female connector components comprise flat trapezoids that can be mated by sliding the narrow end of the male connector component into the wide end of the female connector component. (See FIGS. 10, 13.) Because the female component is much wider at its entry point than the corresponding male component, the parts are easily guided into mated position. (See FIG. 10, item number F15.)

Male and female components may, in one embodiment, be made of galvanized steel to resist corrosion.

Figure 13:
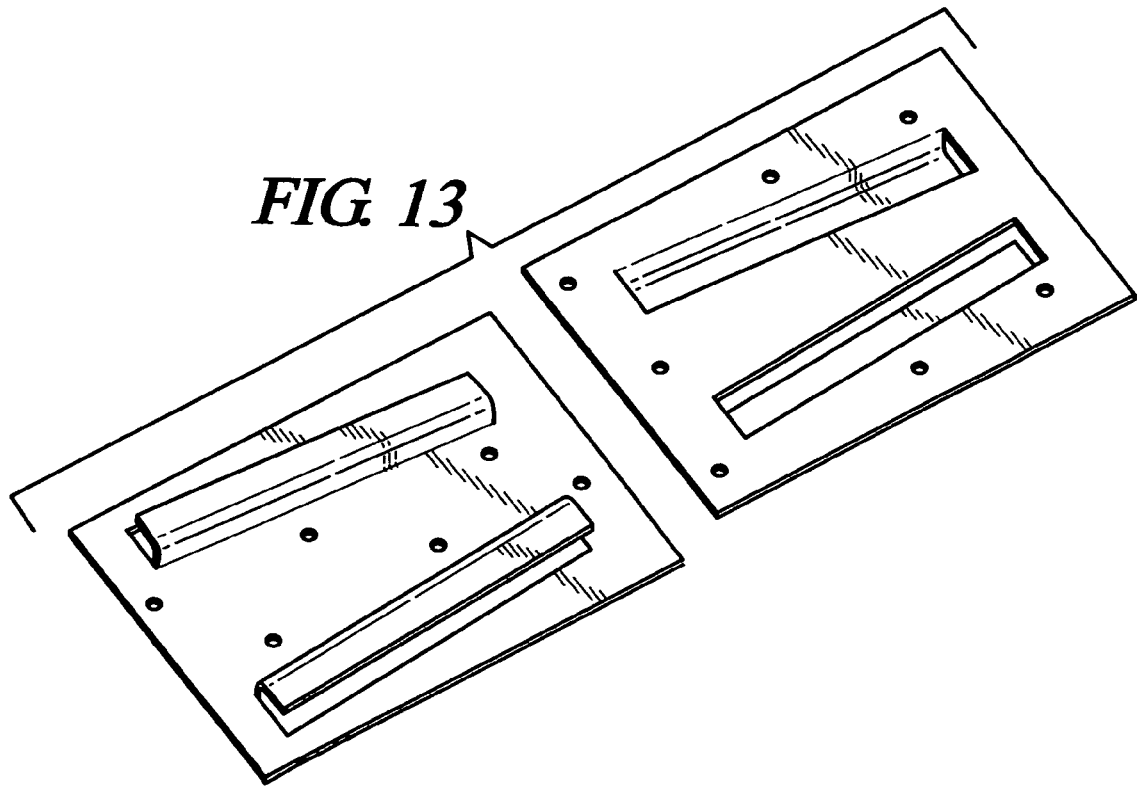
FIG. 13 is a view of a male connector component and a female connector component aligned for mating.
Figure 14:
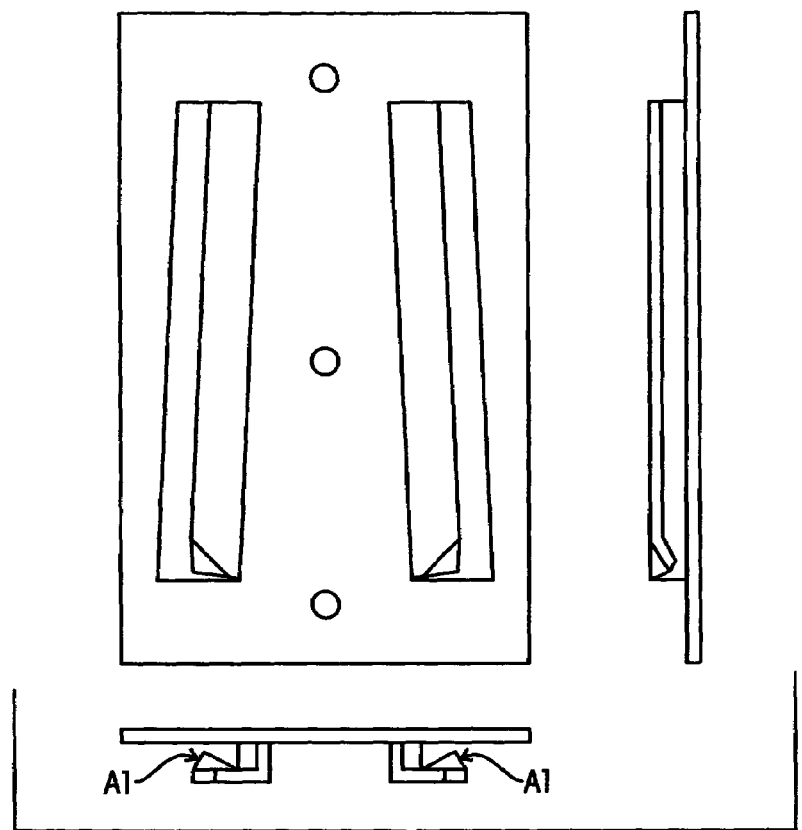
FIG. 14 is three views of a male connector component with alignment tabs.
Figure 15:
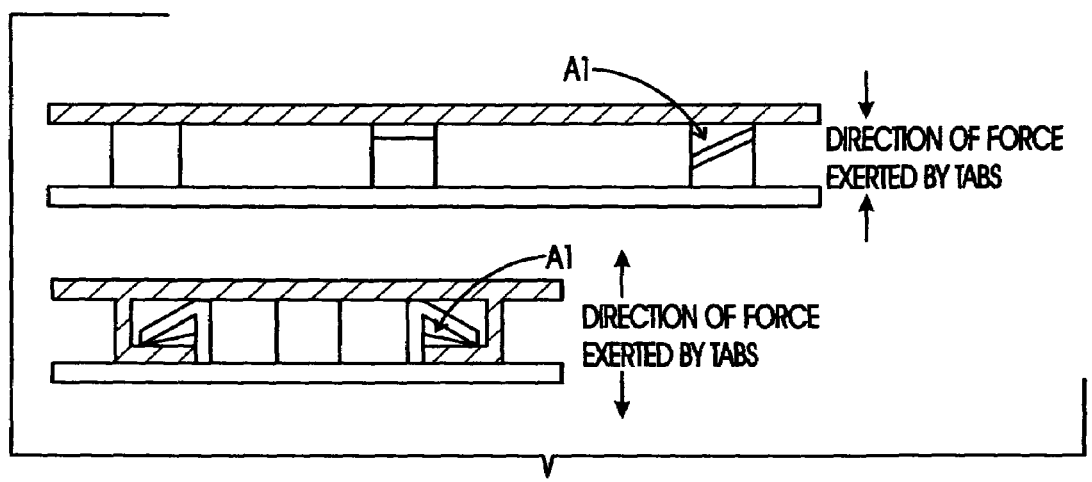
FIG. 15 is two views of a male connector component and a female connector component each equipped with alignment tabs and in a mated configuration.

Referring to FIG. 13, in one embodiment, the connector assembly design avoids costly secondary forming operations by limiting manufacture to basic blank, form, and piercing operations in the shapes and configurations shown in the drawings.

As vertical load is applied to the structure, the mating connector components wedge more tightly together. The resultant joint is strong, rigid, and, exceedingly important, precisely dimensioned.

Referring to FIG. 8, the male connector component is formed of rigid material in illustration, galvanized steel, and consists of a male base plate (M1) with a male front face (M2), a male back face (M3), a male top edge (M4), a male bottom edge (M5), two male side edges (M6), and two longitudinal male connector vanes (M7).

The male connector vanes (M7) are situated in a spaced apart relation such that the vanes are spaced apart more widely near the top edge and more narrowly near the bottom edge of the male base plate. In this relation, boundaries of the male vanes define a trapezoidal shape by encompassing two sides and the points of four corners of the trapezoid.

Each male connector vane consists of a male connector vane sill (M8) and a male connector vane ledge (M9). The male connector vane sill (M8) extends from the face of the male connector front face (M2) to the male connector vane ledge (M9), rigidly connecting the two and supporting the male ledge. The male connector vane ledge (M9), extends outwardly from the male connector vane sill (M8) in a plane essentially parallel to the plane of the male connector front face (M2).

Each male ledge includes a male load bearing outer edge (M10) and a male load bearing inner face (M11). Each male sill includes a male sill load bearing outer face (M13) that comes into contact with the female ledge load bearing inner edge (F10) of FIG. 9, of its corresponding female connector component female ledge (referred to below). Each male ledge load bearing outer edge (M10) comes into contact with the female sill load bearing inner surface (F13) of FIG. 9, of the corresponding female sill. By design, the male ledge load bearing inner face, FIG. 8, (M11) actually comes into little or no contact with the female ledge load bearing inner face (F11) (See FIGS. 15 ad 16).

The load bearing outer edges of the male ledges and the load bearing inner faces of the male sills are dimensioned and angled in such a way as to precisely conform to the interior (essentially trapezoidal) dimensions and angles of the load bearing inner faces and edges of the corresponding female connector component, such that when the male connector component is fully slid into the female connector component, the load bearing surfaces of the male and female connector components rest in essentially full contact, each with those of the other, except, that as mentioned above, the male ledge load bearing inner face (M11) actually comes into little or no contact with the female load bearing inner face (F11).

At this point, the male connector component becomes jammed into place in the female connector component after the manner of a wedge and locks solidly into position. (See FIGS. 10, 15, ad 16.) Within this last fraction of an inch, the connectors become solidly locked together with considerable precision.

By forming the dimension control radii at the corners of the joints where the male or female ledges join their male or female sills, respectively, the radii having a curvature radius "X", essentially equal to the thickness of the material comprising the male or female ledges of its opposite connector component.

Figure 16:
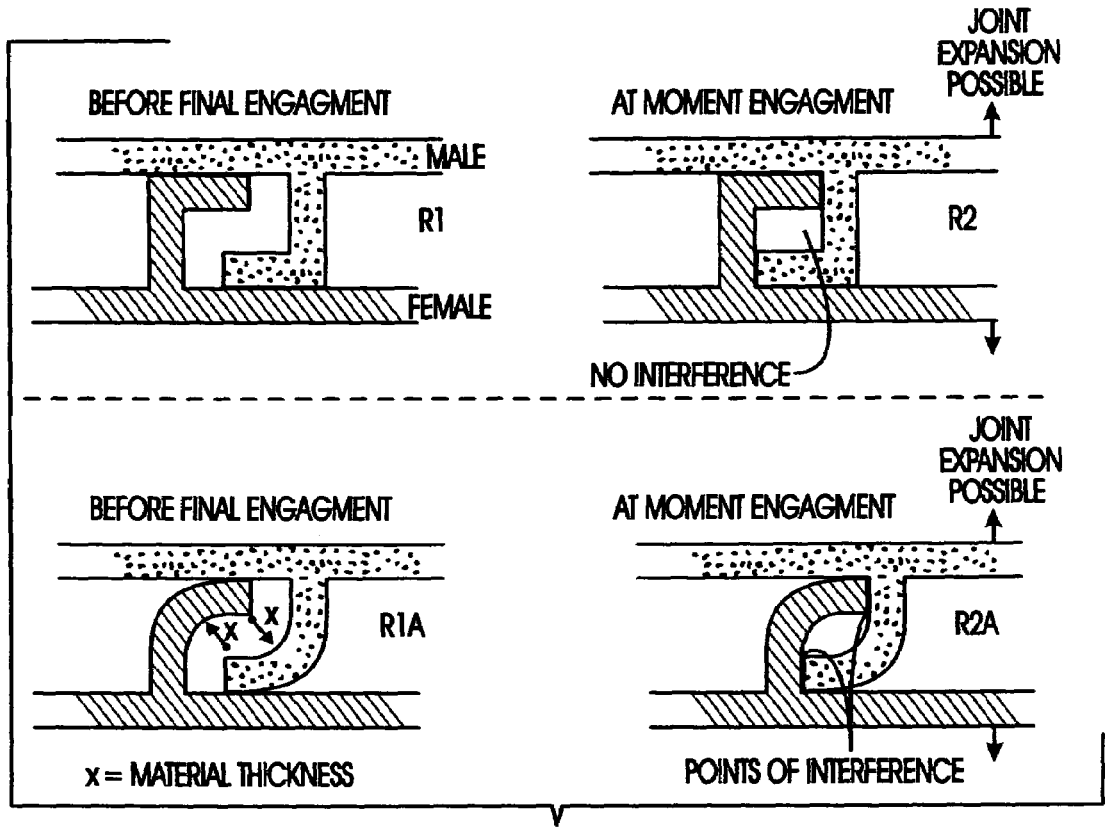
FIG. 16 is four views illustrating the function of Dimension Control Radii by comparing connector component vanes without Dimension Control Radii to vanes equipped with Dimension Control Radii.

FIG. 16 illustrates the advantage gained by incorporation of Dimension Control Radii. FIG. 16, item R2 demonstrates that using conventional, flat sided (or non-strategically curved) connector elements, the ultimate fit is inherently non-precision and loose. However, referring to FIG. 16, item R2A, we can observe that the connector components employing dimension control radii of radius X will always be guided to fit together in a precision manner (X being substantially equal to the thickness of the material comprising the connector). Each time they slide together, they will always fit in precisely the same way.

The female and male connector component vanes are offset longitudinally, the male component offset toward the bottom if its base plate, and the female component offset toward the top of its base plate. So configured, when the male component is fully inserted into the female component, the bottom ends of the male vanes extend into the bottom ends of the female vanes but not beyond the bottom edge of the female base plate, and the female vanes extend beyond the top edge of the male vanes, but not beyond the top edges of the male base plate. In this configuration, the bottom ends of the male vanes rest on the face of the bottom end of the female base plate, and the top ends of the female vanes rest on the face of the top end of the male base plate. This prevents compression or collapse of the joint and further ensures dimensional integrity. (see FIG. 16.)

Referring to FIG. 9, the female connector component comprising of a female connector base plate (F1) with a female front face (F2), a female connector back face (F3), a female connector top edge (F4), a female connector bottom edge (F5), two female connector side edges (F6), and two female longitudinal connector vanes (F7) in a spaced apart relation such that the vanes are spaced apart more widely near the top edge and more narrowly near the bottom edge of the base plate. In this relation, the interior surfaces of the vanes define a trapezoidal shape by encompassing two sides and the points of four corners of the trapezoid.

Each female longitudinal connector vane (F7) consists of a female connector vane sill (F8), and a female connector vane ledge (F9). The female connector vane sill (F8) extends from the face female connector front face (F2) to the female connector vane ledge (F9), rigidly connecting the two and supporting the female ledge. The female connector vane ledge (F9) extends inwardly from the female connector vane sill (F8) in a plane essentially parallel to the plane of their female connector front face (F2).

Each female connector vane ledge (F9) includes a female ledge load bearing inner edge (F10) and a female ledge load bearing inner face (F11). Each female connector vane sill (F8) includes a female sill load bearing inner surface (F13). The load bearing inner EDGES (F10) of the female connector vane ledges (F9) and load bearing inner surfaces (F11) of the female sills (F8) are dimensioned and angled in such a way as to precisely conform to the dimensions and angles of the load bearing faces and edges of the corresponding male connector component.

Thus, when the male connector component is fully slid into the female connector component, the load bearing surfaces of the male and female connector components rest in essentially end to end contact, except that the male ledge load bearing inner surface (M11) actually makes little to no contact with the female ledge load bearing inner surface (F11). This is due to the influence of the dimension control radii. (See FIG. 16, item R2A.) At this point, the male connector component becomes jammed into place in the female connector component after the manner of a wedge and locks solidly into position (See FIGS. 10, 15, and 16.)

Figure 10:
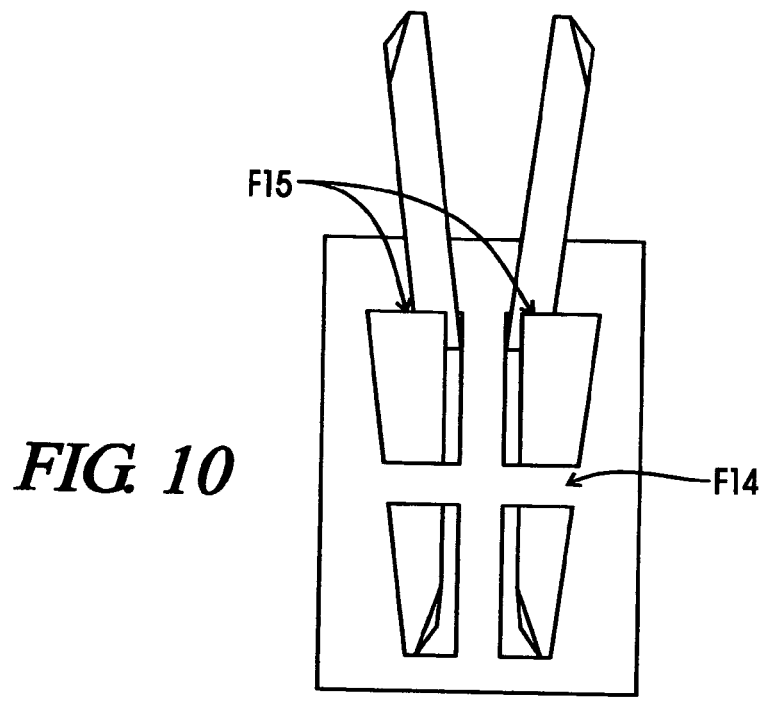
FIG. 10 is a view of a female connector component according to one embodiment that incorporates alignment tabs and a with web in the process of being mated with vanes of a male connector component with alignment tabs.
Figure 11:
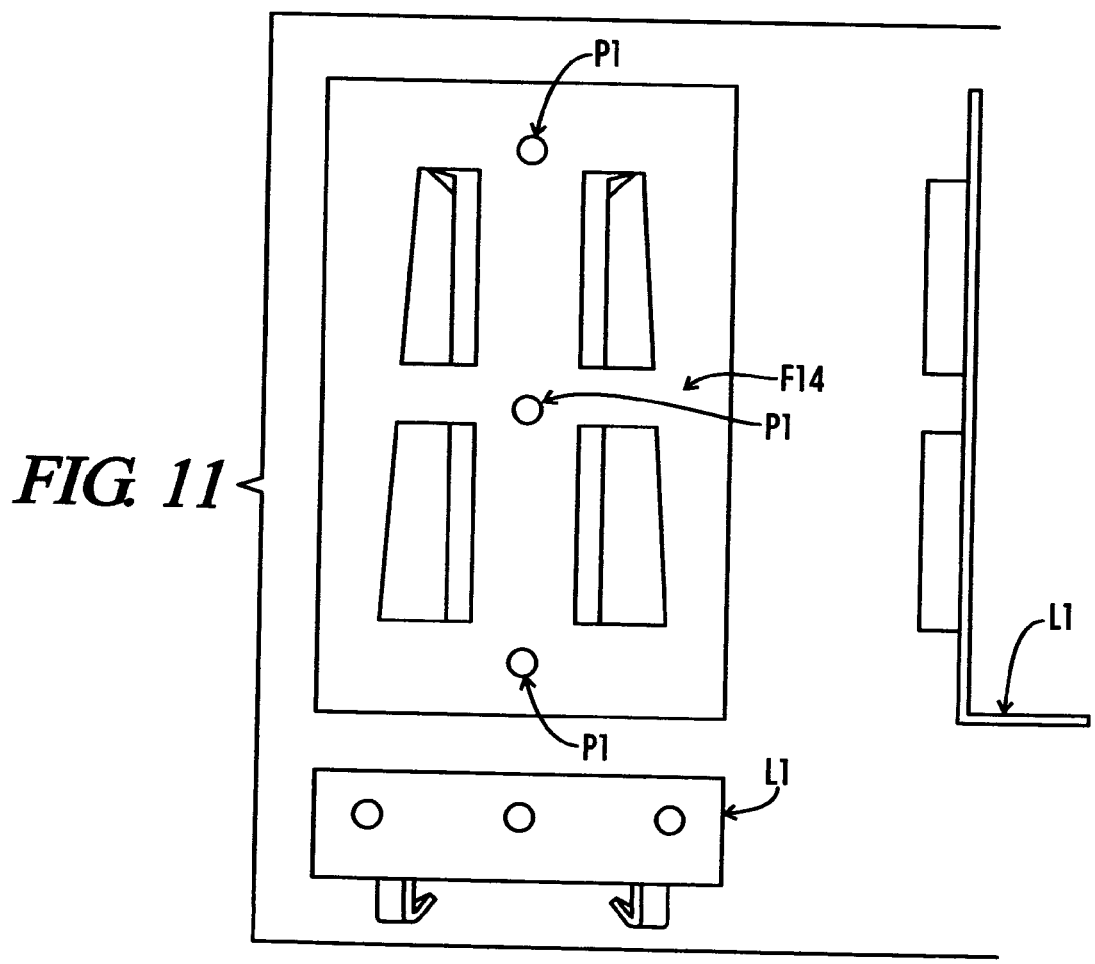
FIG. 11 is three views of a female connector component according to one embodiment that incorporates a width web and an intergral ledger.
Figure 12:
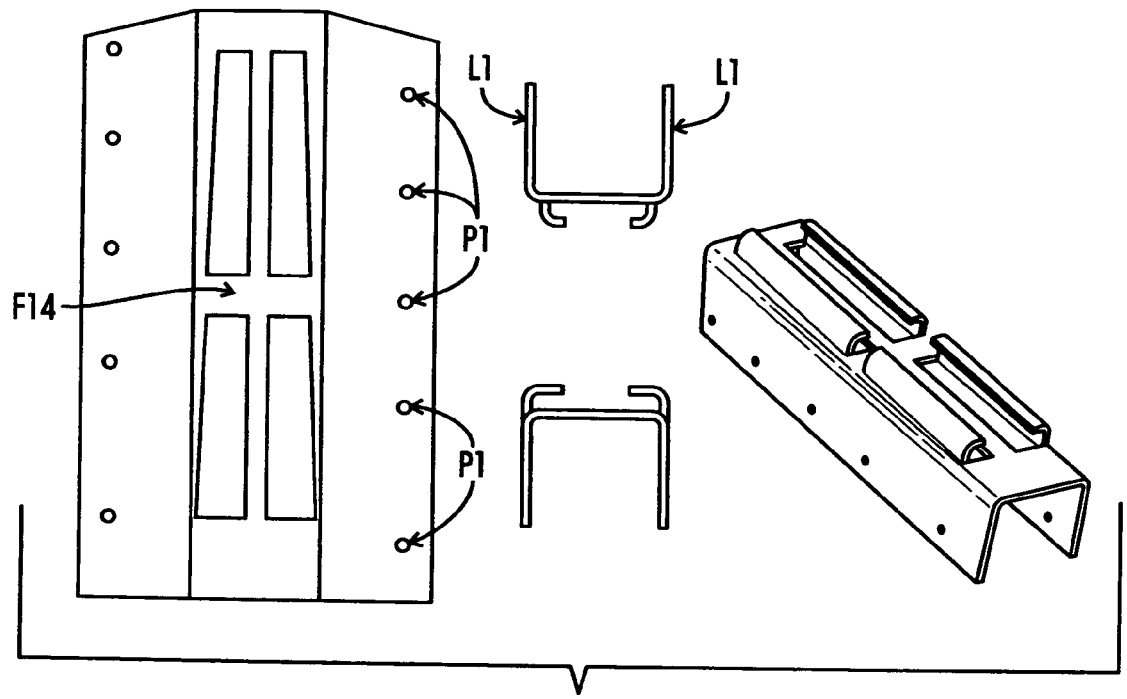
FIG. 12 is four view of a female connector component a width web and two intergral ledgers.

Referring to FIGS. 10, 11 and 12, in one embodiment, the male and/or female connector component also include(s) a width web (F14) a reinforcing member designed to ensure that the integrity of the connector component's width dimension is controlled until the connector component is rigidly mounted to its interchangeable part. This width web also serves as a piloting device to help position the female component as the male component is inserted.

Normal handling during production of the connector assembly can cause inadvertent distortion of its critical width dimension, and the reinforcing width web is incorporated to prevent this from happening. By accomplishing this, the width web ensures that the mating load-bearing surfaces will fully contact each other at the final point of engagement. The width web (F14) extends across the male or female connector base plate (M1 or F1) between the longitudinal connector vanes (M7 or F7).

The width web incorporated into a female connector component, prevents the vanes of that component from spreading apart under the pressure of the inserted vanes of a male connector component, thereby helping to ensure consistently precise male to female fit. Should the female vanes not be controlled in this way, the space between them might expand, allowing the inserted male component to slide too deeply into the female component, causing misalignment of the structural parts being connected y them. The width-web, therfore substantially controls connector alignment and effects structural dimensions by helping the connectors resist sheer forces.

Also by preventing the male component vanes from sliding fully into the female component vanes, the element of vane-offset may be exploited.

In modes incorporating this feature, the male component vanes (M7) are offset on their connector base plate (M1) relative to their corresponding female vanes (F9). This offset is such that the male vanes (M7) are nearer the bottom (M4) of the female base plate (M1) than are the female vanes (F7) to the bottom (F4) of the female base plate (F1). This offset allows the ends of the male vanes (M7) to rest on the female connector front face (F2). Without this element, the male vanes (M7) could fall through the female connector base plate (F1), collapsing the joint created and ruining the precise dimensions.

Referring to FIGS. 11 and 12, in one embodiment, an integral ledger (L1) may be incorporated on one or more top, bottom or side edges of each male and/or female connector base plate. Each integral ledger includes an outer face, an inner face, an outer edge, and an inner edge and two side edges.

The inner edge of each integral ledger is rigidly connected to a top, bottom or side edge of its male or female base plate and extends through the plane of the back of their base plate FIG. 11, item L1, ad FIG. 12, item L1.

In use, the integral ledger snugly contacts the surface of the structural part to which the connector component is attached. So applied, the integral ledger ensures proper positioning of the connector component on the structural part to which it is attached. When placed in operating position, it also serves as a source of support for the connector component of which it is an integral part.

In one embodiment, alignment tabs control the space between adjoining structural components of the male and female connector components. Alignment tabs are formed on the female and male ledges of the connector assembly (See FIGS. 14, and 15, item number A1). At the moment of final engagement, these tabs force the load bearing surfaces of the male and female ledges (FIG. 8, M11 and FIG. 9, F11) apart, situating the interchangeable parts in a predictable controlled position. Consequently, this permits spacing between adjoining interchangeable parts to be controlled to a precision within the normal rolling tolerances of mild steel. Use of alignment tabs allows precise control of connection dimensions and angles, thereby allowing large and complex structures to be built using interchangeable parts without sacrificing precision.

Referring to FIGS. 8 and 9, item DCR1 and to FIG. 16, items R1A and R2A, in another embodiment, the aforesaid functions of precision spacing control are accomplished by forming a Dimension Control Radii (DCR1) curvature at the corners of the joints where the male or female ledge joins its male sill or female sill respectively. The radius of this curvature is essentially equal to the thickness of the material comprising the male or female ledge of its opposite connector component.

By forming Dimension Control Radii at the corners of the points where the male or female ledges join their male or female sills, respectively, the radii having a curvature radius "X", essentially equal to the thickness of the material comprising the male or female ledges of its opposite connector component. FIG. 16 illustrates the advantage gained by incorporation of Dimension Control Radii. FIG. 16, item R2 demonstrates that using conventional flat sided, (or non-strategically curved) connector element, the ultimate fit is inherently non-precision and loose. However, referring to FIG. 16, item R2A, we can observe that the connector components will always be guided to fit together in a precision manner. Each time they are locked together, they will always fit together in precisely the same way.

As the male component slides into place the gradual bend in transition from male sill to male ledge pushes outward against load bearing inner surfaces of the female ledges and sills, thereby positioning and jamming the male connector component snugly and precisely inside the female connector component. (See FIG. 16, item numbers R1A) connectors with dimension control radii, in transit, and (R2A), connectors with dimension control radii, fully joined.) A corresponding guidance action is performed upon the male connector by dimension control radii incorporated into the female connector.

In FIG. 16, item numbers R1 and R2, the same conditions as illustrated by items R1A and R2A are shown, but without the benefit of Dimension Control Radii. In the first condition, connectors without dimension control radii in transit (R1), before final engagement, the joint loose and allows the parts to fit together easily, due to the considerable room for excursion of the parts being joined. However, in the second condition, connectors without dimension control radii, fully joined (R2, at moment of engagement, the joint is still loose and may be expanded in an uncontrolled manner, since there is no interference to prevent such movement.

In item numbers R1A and R2A THE two previously discussed conditions are shown incorporating Dimension Control Radii. In the first condition connectors with dimension control radii, in transit (R1A), before final engagement, the joint is loose and allows the parts to fit together easily, just as was illustrated in (R1). However, in the second condition, at moment of engagement, points of interference created by the Dimension Control Radii prevent excursion of the parts being joined, resulting in a tightly controlled, high precision, joint dimension.

In one embodiment, the base plate and/or integral ledger of either or both the female and the male connector assembly is penetrated by portals through which fasteners, such as nails, screws, bolts, or other rigid fasteners may be passed in order to fasten the connector assemblies to the structural parts that they will join and support. (See FIGS. 11 and 12, item number P1, fastening portal.)

Figure 17:
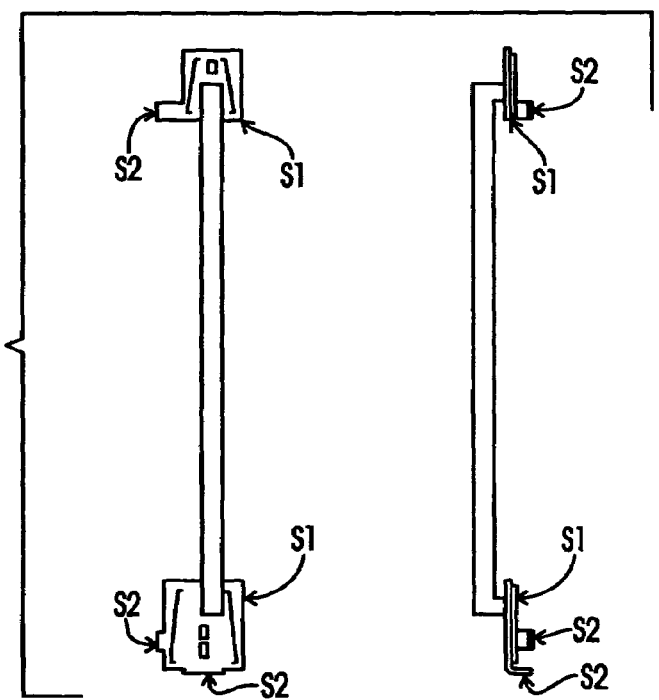
FIG. 17 is two views of a mounting skewer equipped with mounting indices.

Referring to FIG. 17, also disclosed is a manufacturing device for quickly and accurately positioning connector components taught in this patent for mounting on the modular construction parts that are to be connected.

Precise mounting placement of connector components is essential to successful manufacture of the modular structure systems described in this patent. This mounting skewer acts as a guide that eliminates need for measurements or independent placement of individual connector components. The skewer is made with two or more male or female connector components (S1), organic to the device.

In one embodiment, these aforesaid connector components organic to the device are configured with one or more indexing tabs to ensure precise positioning of the skewer when using it to install connectors. See skewer index tab (S2).

In operation, the connector components to be mounted are simply attached to the aforesaid skewer by sliding them into place on the organic connector components of the skewer in the same manner as they would be slid into place when connecting two modular parts. The skewer is then used to position them against a structural component for mounting on that component.

The mounting skewer automatically ensures proper and precise relative positioning and spacing of the connector components being mounted. Additional precision relative to the modular construction part receiving connector component installation is obtained by fitting the index tab(s) (S2) snugly against said modular construction part.

Once the aforesaid connector components are secured to the aforesaid modular construction part, the skewer is disengaged from the components by sliding it off of the now mounted connector components in a reverse manner as to that which was previously used to connect the components to the skewer. This leaves the connector components attached to the modular construction part and ready for use.

The foregoing outlines and describes some of the more pertinent embodiments of the invention. These should be construed as merely illustrative of some of the more prominent forms and applications of the invention. They should not be considered to limit the invention to these embodiments. Many other beneficial results may be obtained by applying the disclosed invention in a different manner or by modifying the invention within the scope of the disclosure.

What is claimed is:

1. A connector assembly for connecting a first structural part to a second structural part;

said connector assembly comprising a first male connector component and a second female connector component, each comprising substantially rigid material, a first male connecter component rigidly mounted on said first structural part, and a second female connecter component rigidly mounted on said second structural part, the male connector component comprising a base plate having, a male front face, a male back face, a male top edge, a male bottom edge, two male side edges, and two longitudinal male connector vanes, the female connector component comprising a base plate having, a female front face, a back face, a top edge, a bottom edge, two side edges, and two longitudinal female connector vanes, the male connector vanes separated along their length such that the inner surfaces at the ends of the vanes nearest the top edge of their base plate extend farther apart than the inner surfaces at the ends of the vanes nearest the bottom edge of their base plate, boundaries of the male vanes defining a trapezoidal shape, essentially comprising two sides and the four corner points of a trapezoid, the female connector vanes separated along their length such that the inner surfaces at the ends of the vanes nearest the top of their base plate extend farther apart than the inner surfaces at the ends of the vanes nearest the bottom of their base plate, the inner surfaces of the vanes defining a trapezoidal shape essentially comprising two sides and the four corner points of the trapezoid, each male vane comprising a male sill and male ledge, each female vane comprising a female sill and a female ledge, each male sill including a load bearing outer face, each female sill including a front edge, and a load bearing inner surface, each male ledge including a load bearing outer edge and a load bearing inner face, each female ledge comprising an inner edge and a load bearing inner face, each male sill extending forward from the face of the male base plate to the male ledge, rigidly connecting the two and supporting the male ledge, each female sill extending from the face of the female base plate to the female ledge, rigidly connecting the two and supporting the female ledge, each male ledge extending outwardly from the male sill in a plane essentially parallel to the plane of the front face of the male base plate, the female ledge extending inwardly from the front edge of the female sill in a plane essentially parallel to the plane of front face of the female base plate, the load bearing outer edges of the male ledges, and the associated load bearing outer surfaces of the male sills, dimensioned and angled in such a way as to precisely conform to the interior essentially trapezoidal dimensions and angles of the female connector component, the load bearing inner edges of the female ledges, and the associated load bearing inner surfaces of the female sills, dimensioned and angled in such a way as to precisely conform to the exterior essentially trapezoidal dimensions and angles of the male connector component, dimension control radii being employed at the corners of the joints where the female or male ledges join the male or female sills, wherein the curvature radius of this joint is essentially equal to the thickness of the material from which the male or female connector components are fabricated and by which the mated male and female ledges are held rigidly and precisely in position, the female connector component vanes being shorter than the male connector component vanes, such that when the male connecter component is fully inserted into the female connecter component, the top ends of the male vanes extend beyond the top ends of the female vanes, to rest, thereby, on the face of the female base plate.

2. A connector assembly for connecting a first structural part to a second structural part;

said connector assembly comprising a first male connector component and a second female connector component, each comprising substantially rigid material, a first male connector component rigidly mounted on said first structural part, and a second female connector component rigidly mounted on said second structural part, the male connector component comprising a base plate having, a male front face, a male back face, a male top edge, a male bottom edge, two male side edges, and two longitudinal male connector vanes, the female connector component comprising a base plate having, a female front face, a back face, a top edge, a bottom edge, two side edges, and two longitudinal female connector vanes, the male connector vanes separated along their length such that the inner surfaces at the ends of the vanes nearest the top edge of their base plate extend farther apart than the inner surfaces at the ends of the vanes nearest the bottom edge of their base plate, boundaries of the male vanes defining a trapezoidal shape, essentially comprising two sides and the four corner points of a trapezoid, the female connector vanes separated along their length such that the inner surfaces at the ends of the vanes nearest the top of their base plate extend farther apart than the inner surfaces at the ends of the vanes nearest the bottom of their base plate, the inner surfaces of the vanes defining a trapezoidal shape essentially comprising two sides and the four corner points of the trapezoid, each male vane comprising a male sill and male ledge, each female vane comprising a female sill and a female ledge, each male sill including a load bearing outer face, each female sill including a front edge, and a load bearing inner surface, each male ledge including a load bearing outer edge and a load bearing inner face, each female ledge comprising an inner edge and a load bearing inner face, each male sill extending forward from the face of the male base plate to the male ledge, rigidly connecting the two and supporting the male ledge, each female sill extending from the face of the female base plate to the female ledge, rigidly connecting the two and supporting the female ledge, each male ledge extending outwardly from the male sill in a plane essentially parallel to the plane of the front face of the male base plate, the female ledge extending inwardly from the front edge of the female sill in a plane essentially parallel to the plane of front face of the female base plate, the load bearing outer edges of the male ledges, and the associated load bearing outer surfaces of the male sills, dimensioned and angled in such a way as to precisely conform to the interior essentially trapezoidal dimensions and angles of the female connector component, the load bearing inner edges of the female ledges, and the associated load bearing inner surfaces of the female sills, dimensioned and angled in such a way as to precisely conform to the exterior essentially trapezoidal dimensions and angles of the male connector component, dimension control radii being employed at the corners of the joints where the female or male ledges join the male or female sills, wherein the curvature radius of this joint is essentially equal to the thickness of the material from which the male or female connector components are fabricated and by which the mated male and female ledges are held rigidly and precisely in position, the female connector component vanes offset toward the bottom of their connector face and the male vane being offset toward the top of their connector face, such that when the male connector component is fully inserted into the female connector component, the top ends of the male vanes extend beyond the top ends of the female vanes, to rest, thereby, on the face of the female base plate and the bottom ends of the female vanes extend beyond the bottom ends of the male vanes, to rest, thereby, on the face of the male base plate.

3. A connector assembly for connecting a first structural part to a second structural part;

said connector assembly comprising a first male connector component and a second female connector component, each comprising substantially rigid material, a first male connector component rigidly mounted on said first structural part, and a second female connector component rigidly mounted on said second structural part, the male connector component comprising a base plate having, a male front face, a male back face, a male top edge, a male bottom edge, two male side edges, and two longitudinal male connector vanes, the female connector component comprising a base plate having, a female front face, a back face, a top edge, a bottom edge, two side edges, and two longitudinal female connector vanes, the male connector vanes separated along their length such that the inner surfaces at the ends of the vanes nearest the top edge of their base plate extend farther apart than the inner surfaces at the ends of the vanes nearest the bottom edge of their base plate, boundaries of the male vanes defining a trapezoidal shape, essentially comprising two sides and the four corner points of a trapezoid, the female connector vanes separated along their length such that the inner surfaces at the ends of the vanes nearest the top of their base plate extend farther apart than the inner surfaces at the ends of the vanes nearest the bottom of their base plate, the inner surfaces of the vanes defining a trapezoidal shape essentially comprising two sides and the four corner points of the trapezoid, each male vane comprising a male sill and male ledge, each female vane comprising a female sill and a female ledge, each male sill including a load bearing outer face, each female sill including a front edge, and a load bearing inner surface, each male ledge including a load bearing outer edge and a load bearing inner face, each female ledge comprising an inner edge and a load bearing inner face, each male sill extending forward from the face of the male base plate to the male ledge, rigidly connecting the two and supporting the male ledge, each female sill extending from the face of the female base plate to the female ledge, rigidly connecting the two and supporting the female ledge, each male ledge extending outwardly from the male sill in a plane essentially parallel to the plane of the front face of the male base plate, the female ledge extending inwardly from the front edge of the female sill in a plane essentially parallel to the plane of front face of the female base plate, the load being outer edges of the male ledges, and the associated load bearing outer surfaces of the male sills, dimensioned and angled in such a way as to precisely conform to the interior essentially trapezoidal dimensions and angles of the female connector component, the load bearing inner edges of the female ledges, and the associated load bearing inner surfaces of the female sills, dimensioned and angled in such a way as to precisely conform to the exterior essentially trapezoidal dimensions and angles of the male connector component, dimension control radii being employed at the corners of the joints where the female or male ledges join the male or female sills, wherein the curvature radius of this joint is essentially equal to the thickness of the material from which the male or female connector components are fabricated and by which the mated male and female ledges are held rigidly and precisely in position.

4. A connector assembly for connecting a first structural part to a second structural part;

said connector assembly comprising a first male connector component and a second female connector component, each comprising substantially rigid material, a first male connector component rigidly mounted on said first structural part, and a second female connector component rigidly mounted on said second structural part, the male connector component comprising a base plate having, a male front face, a male back face, a male top edge, a male bottom edge, two male side edges, and two longitudinal male connector vanes, the female connector component comprising a base plate having, a female front face, a back face, a top edge, a bottom edge, two side edges, and two longitudinal female connector vanes, the male connector vanes separated along their length such that the inner surfaces at the ends of the vanes nearest the top edge of their base plate extend farther apart than the inner surfaces at the ends of the vanes nearest the bottom edge of their base plate, boundaries of the male vanes defining a trapezoidal shape, essentially comprising two sides and the four corner points of a trapezoid, the female connector vanes separated along their length such that the inner surfaces at the ends of the vanes nearest the top of their base plate extend farther apart than the inner surfaces at the ends of the vanes nearest the bottom of their base plate, the inner surfaces of the vanes defining a trapezoidal shape essentially comprising two sides and the four corner points of the trapezoid, each male vane comprising a male sill and male ledge, each female vane comprising a female sill and a female ledge,
each male sill including a load bearing outer face,
each female sill including a front edge, and a load bearing inner surface,
each male ledge including a load bearing outer edge and a load bearing inner face,
each female ledge comprising an inner edge and a load bearing inner face,
each male sill extending forward from the face of the male base plate to the male ledge, rigidly connecting the two and supporting the male ledge,
each female sill extending from the face of the female base plate to the female ledge, rigidly connecting the two and supporting the female ledge,
each male ledge extending outwardly from the male sill in a plane essentially parallel to the plane of the front face of the male base plate,
the female ledge extending inwardly from the front edge of the female sill in a plane essentially parallel to the plane of front face of the female base plate,
the load bearing outer edges of the male ledges, and the associated load bearing outer surfaces of the male sills, dimensioned and angled in such a way as to precisely conform to the interior essentially trapezoidal dimensions and angles of the female connector component,
the load bearing inner edges of the female ledges, and the associated load bearing inner surfaces of the female sills, dimensioned and angled in such a way as to precisely conform to the exterior essentially trapezoidal dimensions and angles of the male connector component,
the female connector component vanes being shorter than the male connector component vanes, such that when the male connector component is fully inserted into the female connector component, the top ends of the male vanes extend beyond the top ends of the female vanes, to rest, thereby, on the face of the female base plate,
wherein alignment tabs are situated on the female and male ledges,
the alignment tabs on the female connector component situated at the bottom ends of the female ledges and curved backward toward the face of the female base plate, and
the alignment tab on the male connector component situated at the top ends of the male base plate and by which the mated male and female ledges are held rigidly and precisely in position.

5. A connector assembly for connecting a first structural part to a second structural part;
said connector assembly comprising a first male connector component and a second female connector component, each comprising substantially rigid material,
a first male connector component rigidly mounted on said first structural part, and a second female connector component rigidly mounted on said second structural part,
the male connector component comprising a base plate having, a male front face, a male back face, a male top edge, a male bottom edge, two male side edges, and two longitudinal male connector vanes,
the female connector component comprising a base plate having, a female front face, a back face, a top edge, a bottom edge, two side edges, and two longitudinal female connector vanes,
the male connector vanes separated along their length such that the inner surfaces at the ends of the vanes nearest the top edge of their base plate extend farther apart than the inner surfaces at the ends of the vanes nearest the bottom edge of their base plate, boundaries of the male vanes defining a trapezoidal shape, essentially comprising two sides and the four corner points of a trapezoid,
the female connector vanes separated along their length such that the inner surfaces at the ends of the vanes nearest the top of their base plate extend farther apart than the inner surfaces at the ends of the vanes nearest the bottom of their base plate, the inner surfaces of the vanes defining a trapezoidal shape essentially comprising two sides and the four corner points of the trapezoid,
each male vane comprising a male sill and male ledge,
each female vane comprising a female sill and a female ledge,
each male sill including a load bearing outer face,
each female sill including a front edge, and a load bearing inner surface,
each male ledge including a load bearing outer edge and a load bearing inner face,
each female ledge comprising an inner edge and a load bearing inner face,
each male sill extending forward from the face of the male base plate to the male ledge, rigidly connecting the two and supporting the male ledge,
each female sill extending from the face of the female base plate to the female ledge, rigidly connecting the two and supporting the female ledge,
each male ledge extending outwardly from the male sill in a plane essentially parallel to the plane of the front face of the male base plate,
the female ledge extending inwardly from the front edge of the female sill in a plane essentially parallel to the plane of front face of the female base plate,
the load bearing outer edges of the male ledges, and the associated load bearing outer surfaces of the male sills, dimensioned and angled in such a way as to precisely conform to the interior essentially trapezoidal dimensions and angles of the female connector component,
the load bearing inner edges of the female ledges, and the associated load bearing inner surfaces of the female sills, dimensioned and angled in such a way as to precisely conform to the exterior essentially trapezoidal dimensions and angles of the male connector component,
the female connector component vanes offset toward the bottom of their connector face and the male vane being offset toward the top of their connector face, such that when the male connector component is fully inserted into the female connector component, the top ends of the male vanes extend beyond the top ends of the female vanes, to rest, thereby, on the face of the female base plate and the bottom ends of the female vanes extend beyond the bottom ends of the male vanes, to rest, thereby, on the face of the male base plate,
wherein alignment tabs are situated on the female and male ledges,
the alignment tabs on the female connector component situated at the bottom ends of the female ledges and curved backward toward the face of the female base plate, and
the alignment tab on the male connector component situated at the top ends of the male base plate and by which the mated male and female ledges are held rigidly and precisely in position.

6. A connector assembly for connecting a first structural part to a second structural part;
said connector assembly comprising a first male connector component and a second female connector component, each comprising substantially rigid material,
a first male connector component rigidly mounted on said first structural part, and a second female connector component rigidly mounted on said second structural part,
the male connector component comprising a base plate having, a male front face, a male back face, a male top edge, a male bottom edge, two male side edges, and two longitudinal male connector vanes,
the female connector component comprising a base plate having, a female front face, a back face, a top edge, a bottom edge, two side edges, and two longitudinal female connector vanes,
the male connector vanes separated along their length such that the inner surfaces at the ends of the vanes nearest the top edge of their base plate extend farther apart than the inner surfaces at the ends of the vanes nearest the bottom edge of their base plate, boundaries of the male vanes defining a trapezoidal shape, essentially comprising two sides and the four corner points of a trapezoid,
the female connector vanes separated along their length such that the inner surfaces at the ends of the vanes nearest the top of their base plate extend farther apart than the inner surfaces at the ends of the vanes nearest the bottom of their base plate, the inner surfaces of the vanes defining a trapezoidal shape essentially comprising two sides and the four corner points of the trapezoid,
each male vane comprising a male sill and male ledge,
each female vane comprising a female sill and a female ledge,
each male sill including a load bearing outer face,
each female sill including a front edge, and a load bearing inner surface,
each male ledge including a load bearing outer edge and a load bearing inner face,
each female ledge comprising an inner edge and a load bearing inner face,
each male sill extending forward from the face of the male base plate to the male ledge, rigidly connecting the two and supporting the male ledge,
each female sill extending from the face of the female base plate to the female ledge, rigidly connecting the two and supporting the female ledge,
each male ledge extending outwardly from the male sill in a plane essentially parallel to the plane of the front face of the male base plate,
the female ledge extending inwardly from the front edge of the female sill in a plane essentially parallel to the plane of front face of the female base plate,
the load bearing outer edges of the male ledges, and the associated load bearing outer surfaces of the male sills, dimensioned and angled in such a way as to precisely conform to the interior essentially trapezoidal dimensions and angles of the female connector component,
the load bearing inner edges of the female ledges, and the associated load bearing inner surfaces of the female sills, dimensioned and angled in such a way as to precisely conform to the exterior essentially trapezoidal dimensions and angles of the male connector component,
wherein alignment tabs are situated on the female and male ledges,
the alignment tabs on the female connector component situated at the bottom ends of the female ledges and curved backward toward the face of the female base plate, and
the alignment tab on the male connector component situated at the top ends of the male base plate and by which the mated male and female ledges are held rigidly and precisely in position.

7. A connector assembly for connecting a first structural part to a second structural part;
said connector assembly comprising a first male connector component and a second female connector component, each comprising substantially rigid material,
a first male connector component rigidly mounted on said first structural part, and a second female connector component rigidly mounted on said second structural part,
the male connector component comprising a base plate having, a male front face, a male back face, a male top edge, a male bottom edge, two male side edges, and two longitudinal male connector vanes,
the female connector component comprising a base plate having, a female front face, a back face, a top edge, a bottom edge, two side edges, and two longitudinal female connector vanes,
the male connector vanes separated along their length such that the inner surfaces at the ends of the vanes nearest the top edge of their base plate extend farther apart than the inner surfaces at the ends of the vanes nearest the bottom edge of their base plate, boundaries of the male vanes defining a trapezoidal shape, essentially comprising two sides and the four corner points of a trapezoid,
the female connector vanes separated along their length such that the inner surfaces at the ends of the vanes nearest the top of their base plate extend farther apart than the inner surfaces at the ends of the vanes nearest the bottom of their base plate, the inner surfaces of the vanes defining a trapezoidal shape essentially comprising two sides and the four corner points of the trapezoid,
each male vane comprising a male sill and male ledge,
each female vane comprising a female sill and a female ledge,
each male sill including a load bearing outer face,
each female sill including a front edge, and a load bearing inner surface,
each male ledge including a load bearing outer edge and a load bearing inner face,
each female ledge comprising an inner edge and a load bearing inner face,
each male sill extending forward from the face of the male base plate to the male ledge, rigidly connecting the two and supporting the male ledge,
each female sill extending from the face of the female base plate to the female ledge, rigidly connecting the two and supporting the female ledge,
each male ledge extending outwardly from the male sill in a plane essentially parallel to the plane of the front face of the male base plate,
the female ledge extending inwardly from the front edge of the female sill in a plane essentially parallel to the plane of front face of the female base plate,
the load bearing outer edges of the male ledges, and the associated load bearing outer surfaces of the male sills, dimensioned and angled in such a way as to precisely conform to the interior essentially trapezoidal dimensions and angles of the female connector component, the load bearing inner edges of the female ledges, and the associated load bearing inner surfaces of the female sills, dimensioned and angled in such a way as to precisely conform to the exterior essentially trapezoidal dimensions and angles of the male connector component, dimension control radii being employed at the corners of the joints where the female or male ledges join the male or female sills, wherein the curvature radius of this joint is essentially equal to the thickness of the material from which the male or female connector components are fabricated and by which the mated male and female ledges are held rigidly and precisely in position, the female connector component vanes being shorter than the male connector component vanes, such that when the male connector component is fully inserted into the female connector component, the top ends of the male vanes extend beyond the top ends of the female vanes, to rest, thereby, on the face of the female base plate, wherein the male and female connector components incorporate a width-web reinforcement, bifurcating the connector vanes of one or more connector components.

8. A connector assembly for connecting a first structural part to a second structural part;

said connector assembly comprising a first male connector component and a second female connector component, each comprising substantially rigid material, a first male connector component rigidly mounted on said first structural part, and a second female connector component rigidly mounted on said second structural part, the male connector component comprising a base plate having, a male front face, a male back face, a male top edge, a male bottom edge, two male side edges, and two longitudinal male connector vanes, the female connector component comprising a base plate having, a female front face, a back face, a top edge, a bottom edge, two side edges, and two longitudinal female connector vanes, the male connector vanes separated along their length such that the inner surfaces at the ends of the vanes nearest the top edge of their base plate extend farther apart than the inner surfaces at the ends of the vanes nearest the bottom edge of their base plate, boundaries of the male vanes defining a trapezoidal shape, essentially comprising two sides and the four corner points of a trapezoid, the female connector vanes separated along their length such that the inner surfaces at the ends of the vanes nearest the top of their base plate extend farther apart than the inner surfaces at the ends of the vanes nearest the bottom of their base plate, the inner surfaces of the vanes defining a trapezoidal shape essentially comprising two sides and the four corner points of the trapezoid, each male vane comprising a male sill and male ledge, each female vane comprising a female sill and a female ledge, each male sill including a load bearing outer face, each female sill including a front edge, and a load bearing inner surface, each male ledge including a load bearing outer edge and a load bearing inner face, each female ledge comprising an inner edge and a load bearing inner face, each male sill extending forward from the face of the male base plate to the male ledge, rigidly connecting the two and supporting the male ledge, each female sill extending from the face of the female base plate to the female ledge, rigidly connecting the two and supporting the female ledge, each male ledge extending outwardly from the male sill in a plane essentially parallel to the plane of the front face of the male base plate, the female ledge extending inwardly from the front edge of the female sill in a plane essentially parallel to the plane of front face of the female base plate, the load bearing outer edges of the male ledges, and the associated load bearing outer surfaces of the male sills, dimensioned and angled in such a way as to precisely conform to the interior essentially trapezoidal dimensions and angles of the female connector component, the load being inner edges of the female ledges, and the associated load bearing inner surfaces of the female sills, dimensioned and angled in such a way as to precisely conform to the exterior essentially trapezoidal dimensions and angles of the male connector component, dimension control radii being employed at the corners of the joints where the female or male ledges join the male or female sills, wherein the curvature radius of this joint is essentially equal to the thickness of the material from which the male or female connector components are fabricated and by which the mated male and female ledges are held rigidly and precisely in position, the female connector component vanes offset toward the bottom of their connector face and the male vane being offset toward the top of their connector face, such that when the male connector component is fully inserted into the female connector component, the top ends of the male vanes extend beyond the top ends of the female vanes, to rest, thereby, on the face of the female base plate and the bottom ends of the female vanes extend beyond the bottom ends of the male vanes, to rest, thereby, on the face of the male base plate, wherein the male and female connector components incorporate a width-web reinforcement, bifurcating the connector vanes of one or more connector components.

9. A connector assembly for connecting a first structural part to a second structural part;

said connector assembly comprising a first male connector component and a second female connector component, each comprising substantially rigid material, a first male connector component rigidly mounted on said first structural part, and a second female connector component rigidly mounted on said second structural part, the male connector component comprising a base plate having, a male front face, a male back face, a male top edge, a male bottom edge, two male side edges, and two longitudinal male connector vanes, the female connector component comprising a base plate having, a female front face, a back face, a top edge, a bottom edge, two side edges, and two longitudinal female connector vanes, the male connector vanes separated along their length such that the inner surfaces at the ends of the vanes nearest the top edge of their base plate extend farther apart than the inner surfaces at the ends of the vanes nearest the bottom edge of their base plate, boundaries of the male vanes defining a trapezoidal shape, essentially comprising two sides and the four corner points of a trapezoid, the female connector vanes separated along their length such that the inner surfaces at the ends of the vanes nearest the top of their base plate extend farther apart than the inner surfaces at the ends of the vanes nearest the bottom of their base plate, the inner surfaces of the vanes defining a trapezoidal shape essentially comprising two sides and the four corner points of the trapezoid, each male vane comprising a male sill and male ledge, each female vane comprising a female sill and a female ledge, each male sill including a load bearing outer face, each female sill including a front edge, and a load bearing inner surface, each male ledge including a load bearing outer edge and a load bearing inner face, each female ledge comprising an inner edge and a load bearing inner face, each male sill extending forward from the face of the male base plate to the male ledge, rigidly connecting the two and supporting the male ledge, each female sill extending from the face of the female base plate to the female ledge, rigidly connecting the two and supporting the female ledge, each male ledge extending outwardly from the male sill in a plane essentially parallel to the plane of the front face of the male base plate, the female ledge extending inwardly from the front edge of the female sill in a plane essentially parallel to the plane of front face of the female base plate, the load bearing outer edges of the male ledges, and the associated load bearing outer surfaces of the male sills, dimensioned and angled in such a way as to precisely conform to the interior essentially trapezoidal dimensions and angles of the female connector component, the load bearing inner edges of the female ledges, and the associated load bearing inner surfaces of the female sills, dimensioned and angled in such a way as to precisely conform to the exterior essentially trapezoidal dimensions and angles of the male connector component, dimension control radii being employed at the corners of the joints where the female or male ledges join the male or female sills, wherein the curvature radius of this joint is essentially equal to the thickness of the material from which the male or female connector components are fabricated and by which the mated male and female ledges are held rigidly and precisely in position, wherein the male and female connector components incorporate a width-web reinforcement, bifurcating the connector vanes of one or more connector components.

10. A connector assembly for connecting a first structural part to a second structural part;

said connector assembly comprising a first male connector component and a second female connector component, each comprising substantially rigid material, a first male connector component rigidly mounted on said first structural part, and a second female connector component rigidly mounted on said second structural part, the male connector component comprising a base plate having, a male front face, a male back face, a male top edge, a male bottom edge, two male side edges, and two longitudinal male connector vanes, the female connector component comprising a base plate having, a female front face, a back face, a top edge, a bottom edge, two side edges, and two longitudinal female connector vanes, the male connector vanes separated along their length such that the inner surfaces at the ends of the vanes nearest the top edge of their base plate extend farther apart than the inner surfaces at the ends of the vanes nearest the bottom edge of their base plate, boundaries of the male vanes defining a trapezoidal shape, essentially comprising two sides and the four corner points of a trapezoid, the female connector vanes separated along their length such that the inner surfaces at the ends of the vanes nearest the top of their base plate extend farther apart than the inner surfaces at the ends of the vanes nearest the bottom of their base plate, the inner surfaces of the vanes defining a trapezoidal shape essentially comprising two sides and the four corner points of the trapezoid, each male vane comprising a male sill and male ledge, each female vane comprising a female sill and a female ledge, each male sill including a load bearing outer face, each female sill including a front edge, and a load bearing inner surface, each male ledge including a load bearing outer edge and a load bearing inner face, each female ledge comprising an inner edge and a load bearing inner face, each male sill extending forward from the face of the male base plate to the male ledge, rigidly connecting the two and supporting the male ledge, each female sill extending from the face of the female base plate to the female ledge, rigidly connecting the two and supporting the female ledge, each male ledge extending outwardly from the male sill in a plane essentially parallel to the plane of the front face of the male base plate, the female ledge extending inwardly from the front edge of the female sill in a plane essentially parallel to the plane of front face of the female base plate, the load bearing outer edges of the male ledges, and the associated load bearing outer surfaces of the male sills, dimensioned and angled in such a way as to precisely conform to the interior essentially trapezoidal dimensions and angles of the female connector component, the load bearing inner edges of the female ledges, and the associated load bearing inner surfaces of the female sills, dimensioned and angled in such a way as to precisely conform to the exterior essentially trapezoidal dimensions and angles of the male connector component, the female connector component vanes being shorter than the male connector component vanes, such that when the male connector component is fully inserted into the female connector component, the top ends of the male vanes extend beyond the top ends of the female vanes, to rest, thereby, on the face of the female base plate, wherein the male and female connector components incorporate a width-web reinforcement, bifurcating the connector vanes of one or more connector components, wherein alignment tabs are situated on the female and male ledges, the alignment tabs on the female connector component situated at the bottom ends of the female ledges and curved backward toward the face of the female base plate, and the alignment tab on the male connector component situated at the top ends of the male base plate and by which the mated male and female ledges are held rigidly and precisely in position.

11. A connector assembly for connecting a first structural part to a second structural part;

said connector assembly comprising a first male connector component and a second female connector component, each comprising substantially rigid material, a first male connector component rigidly mounted on said first structural part, and a second female connector component rigidly mounted on said second structural part, the male connector component comprising a base plate having, a male front face, a male back face, a male top edge, a male bottom edge, two male side edges, and two longitudinal male connector vanes, the female connector component comprising a base plate having, a female front face, a back face, a top edge, a bottom edge, two side edges, and two longitudinal female connector vanes, the male connector vanes separated along their length such that the inner surfaces at the ends of the vanes nearest the top edge of their base plate extend farther apart than the inner surfaces at the ends of the vanes nearest the bottom edge of their base plate, boundaries of the male vanes defining a trapezoidal shape, essentially comprising two sides and the four corner points of a trapezoid, the female connector vanes separated along their length such that the inner surfaces at the ends of the vanes nearest the top of their base plate extend farther apart than the inner surfaces at the ends of the vanes nearest the bottom of their base plate, the inner surfaces of the vanes defining a trapezoidal shape essentially comprising two sides and the four corner points of the trapezoid, each male vane comprising a male sill and male ledge, each female vane comprising a female sill and a female ledge, each male sill including a load bearing outer face, each female sill including a front edge, and a load bearing inner surface, each male ledge including a load bearing outer edge and a load bearing inner face, each female ledge comprising an inner edge and a load bearing inner face, each male sill extending forward from the face of the male base plate to the male ledge, rigidly connecting the two and supporting the male ledge, each female sill extending from the face of the female base plate to the female ledge, rigidly connecting the two and supporting the female ledge, each male ledge extending outwardly from the male sill in a plane essentially parallel to the plane of the front face of the male base plate, the female ledge extending inwardly from the front edge of the female sill in a plane essentially parallel to the plane of front face of the female base plate, the load bearing outer edges of the male ledges, and the associated load bearing outer surfaces of the male sills, dimensioned and angled in such a way as to precisely conform to the interior essentially trapezoidal dimensions and angles of the female connector component, the load bearing inner edges of the female ledges, and the associated load bearing inner surfaces of the female sills, dimensioned and angled in such a way as to precisely conform to the exterior essentially trapezoidal dimensions and angles of the male connector component, the female connector component vanes offset toward the bottom of their connector face and the male vane being offset toward the top of their connector face, such that when the male connector component is fully inserted into the female connector component, the top ends of the male vanes extend beyond the top ends of the female vanes, to rest, thereby, on the face of the female base plate and the bottom ends of the female vanes extend beyond the bottom ends of the male vanes, to rest, thereby, on the face of the male base plate, wherein the male and female connector components incorporate a width-web reinforcement, bifurcating the connector vanes of one or more connector components, wherein alignment tabs are situated on the female and male ledges, the alignment tabs on the female connector component situated at the bottom ends of the female ledges and curved backward toward the face of the female base plate, and the alignment tab on the male connector component situated at the top ends of the male base plate and by which the mated male and female ledges are held rigidly and precisely in position.

12. A connector assembly for connecting a first structural part to a second structural part;

said connector assembly comprising a first male connector component and a second female connector component, each comprising substantially rigid material, a first male connector component rigidly mounted on said first structural part, and a second female connector component rigidly mounted on said second structural part, the male connector component comprising a base plate having, a male front face, a male back face, a male top edge, a male bottom edge, two male side edges, and two longitudinal male connector vanes, the female connector component comprising a base plate having, a female front face, a back face, a top edge, a bottom edge, two side edges, and two longitudinal female connector vanes, the male connector vanes separated along their length such that the inner surfaces at the ends of the vanes nearest the top edge of their base plate extend farther apart than the inner surfaces at the ends of the vanes nearest the bottom edge of their base plate, boundaries of the male vanes defining a trapezoidal shape, essentially comprising two sides and the four corner points of a trapezoid, the female connector vanes separated along their length such that the inner surfaces at the ends of the vanes nearest the top of their base plate extend farther apart than the inner surfaces at the ends of the vanes nearest the bottom of their base plate, the inner surfaces of the vanes defining a trapezoidal shape essentially comprising two sides and the four corner points of the trapezoid, each male vane comprising a male sill and male ledge, each female vane comprising a female sill and a female ledge, each male sill including a load bearing outer face, each female sill including a front edge, and a load bearing inner surface, each male ledge including a load bearing outer edge and a load bearing inner face, each female ledge comprising an inner edge and a load bearing inner face, each male sill extending forward from the face of the male base plate to the male ledge, rigidly connecting the two and supporting the male ledge, each female sill extending from the face of the female base plate to the female ledge, rigidly connecting the two and supporting the female ledge, each male ledge extending outwardly from the male sill in a plane essentially parallel to the plane of the front face of the male base plate, the female ledge extending inwardly from the front edge of the female sill in a plane essentially parallel to the plane of front face of the female base plate, the load bearing outer edges of the male ledges, and the associated load bearing outer surfaces of the male sills, dimensioned and angled in such a way as to precisely conform to the interior essentially trapezoidal dimensions and angles of the female connector component, the load bearing inner edges of the female ledges, and the associated load bearing inner surfaces of the female sills, dimensioned and angled in such a way as to precisely conform to the exterior essentially trapezoidal dimensions and angles of the male connector component, wherein the male and female connector components incorporate a width-web reinforcement, bifurcating the connector vanes of one or more connector components, wherein alignment tabs are situated on the female and male ledges, the alignment tabs on the female connector component situated at the bottom ends of the female ledges and curved backward toward the face of the female base plate, and the alignment tab on the male connector component situated at the top ends of the male base plate and by which the mated male and female ledges are held rigidly and precisely in position.

13. A method of manufacturing solid structures, comprising the steps of;
   (a) providing one or more connector assemblies for connecting a first structural part for a structure to a second structural part;
   (b) each connector assembly comprising a first male connector component and a second female connector component, each component comprising substantially rigid material,
   (c) each first male connector component rigidly mounted on said first structural part, and each second female connector component rigidly mounted on said second structural part,
   (d) each male connector component comprising a base plate having, a male front face, a male back face, a male top edge, a male bottom edge, two male side edges, and two longitudinal male connector vanes,
   (e) each female connector component comprising a base plate having, a female front face, a back face, a top edge, a bottom edge, two side edges, and two longitudinal female connector vanes,
   (f) the vanes for each male connector separated along their length such that the inner surfaces at the ends of the vanes nearest the top edge of their base plate extend farther apart than the inner surfaces at the ends of the vanes nearest the bottom edge of their base plate, boundaries of the male vanes defining a trapezoidal shape, essentially comprising two sides and the four corner points of a trapezoid,
   (g) the vanes for each female connector separated along their length such that the inner surfaces at the ends of the vanes nearest the top of their base plate extend farther apart than the inner surfaces at the ends of the vanes nearest the bottom of their base plate, the inner surfaces of the vanes defining a trapezoidal shape essentially comprising two sides and the four corner points of the trapezoid,
   (h) each male vane comprising a male sill and male ledge,
   (i) each female vane comprising a female sill and a female ledge,
   (j) each male sill including a load bearing outer face,
   (k) each female sill including a front edge, and a load bearing inner surface,
   (l) each male ledge including a load bearing outer edge and a load bearing inner face,
   (m) each female ledge comprising an inner edge and a load bearing inner face,
   (n) each male sill extending forward from the face of the male base plate to the male ledge, rigidly connecting the two and supporting the male ledge,
   (o) each female sill extending from the face of the female base plate to the female ledge, rigidly connecting the two and supporting the female ledge,
   (p) each male ledge extending outwardly from the male sill in a plane essentially parallel to the plane of the front face of the male base plate,
   (q) each female ledge extending inwardly from the front edge of the female sill in a plane essentially parallel to the plane of front face of the female base plate,
   (r) the load being outer edges of the male ledges, and the associated load bearing outer surfaces of the male sills, dimensioned and angled in such a way as to precisely conform to the interior essentially trapezoidal dimensions and angles of the female connector component,
   (s) the load bearing inner edges of the female ledges, and the associated load bearing inner surfaces of the female sills, dimensioned and angled in such a way as to precisely conform to the exterior essentially trapezoidal dimensions and angles of the male connector component,
   (t) dimension control radii being employed at the corners of the joints where the female or male ledges Join the male or female sills, wherein the curvature radius of this joint is essentially equal to the thickness of the material from which the male or female connector components are fabricated and by which the mated male and female ledges are held rigidly and precisely in position.

14. A method of manufacturing solid structures, comprising the steps of;
   (a) providing one or more connector assemblies for connecting a first structural part for a structure to a second structural part;
   (b) each connector assembly comprising a first male connector component and a second female connector component, each component comprising substantially rigid material,
   (c) each first male connector component rigidly mounted on said first structural part, and each second female connector component rigidly mounted on said second structural part, (d) each male connector component comprising a base plate having, a male front face, a male back face, a male top edge, a male bottom edge, two male side edges, and two longitudinal male connector vanes, (e) each female connector component comprising a base plate having, a female front face, a back face, a top edge, a bottom edge, two side edges, and two longitudinal female connector vanes, (f) the vanes for each male connector separated along their length such that the inner surfaces at the ends of the vanes nearest the top edge of their base plate extend farther apart than the inner surfaces at the ends of the vanes nearest the bottom edge of their base plate, boundaries of the male vanes defining a trapezoidal shape, essentially comprising two sides and the four corner points of a trapezoid, (g) the vanes for each female connector separated along their length such that the inner surfaces at the ends of the vanes nearest the top of their base plate extend farther apart than the inner surfaces at the ends of the vanes nearest the bottom of their base plate, the inner surfaces of the vanes defining a trapezoidal shape essentially comprising two sides and the four corner points of the trapezoid, (h) each male vane comprising a male sill and male ledge, (i) each female vane comprising a female sill and a female ledge, (j) each male sill including a load bearing outer face, (k) each female sill including a front edge, and a load bearing inner surface, (l) each male ledge including a load bearing outer edge and a load bearing inner face, (m) each female ledge comprising an inner edge and a load bearing inner face, (n) each male sill extending forward from the face of the male base plate to the male ledge, rigidly connecting the two and supporting the male ledge, (o) each female sill extending from the face of the female base plate to the female ledge, rigidly connecting the two and supporting the female ledge, (p) each male ledge extending outwardly from the male sill in a plane essentially parallel to the plane of the front face of the male base plate, (q) each female ledge extending inwardly from the front edge of the female sill in a plane essentially parallel to the plane of front face of the female base plate, (r) the load bearing outer edges of the male ledges, and the associated load bearing outer surfaces of the male sills, dimensioned and angled in such a way as to precisely conform to the interior essentially trapezoidal dimensions and angles of the female connector component, (s) the load bearing inner edges of the female ledges, and the associated load bearing inner surfaces of the female sills, dimensioned and angled in such a way as to precisely conform to the exterior essentially trapezoidal dimensions and angles of the male connector component, (t) alignment tabs being situated on the female and male ledges, (u) the alignment tabs on the female connector component situated at the bottom ends of the female ledges and curved backward toward the face of the female base plate, and (v) the alignment tab on the male connector component situated at the top ends of the male base plate and by which the mated male and female ledges are held rigidly and precisely in position.

15. A method of manufacturing kits for building solid structures wherein the means of mounting male and female connector assemblies on their associated first and second structural parts, respectively, comprises the steps of;

(a) providing one or more connector assemblies for connecting a first structural part for a structure to a second structural part for a structure, (b) each connector assembly comprising a first male connector component and a second female connector component, each comprising substantially rigid material, (c) a first male connector component to be rigidly mounted, in the manufacturing process, on said first structural part, and a second female connector component to be rigidly mounted, in the manufacturing process, on said second structural part, (d) providing a mounting apparatus, said mounting apparatus comprising male or female connector components being spaced apart in an orientation and relationship that substantially matches the orientation and relationship required of selected female or male connector components when properly positioned on the structural parts to be connected, (e) installing male and female connector components on the associated first and second structural parts by means of said mounting apparatus through the steps of;

(f) mating to each male or female connector component of the mounting apparatus, a corresponding female or male connector component, for the purpose of mounting said corresponding component on a selected structural part, (g) pressing said corresponding connector components, while mated to the mounting apparatus, into place on the selected structural parts where they are to be installed, (h) affixing the corresponding connector components to the said selected structural parts, (i) unmating the mounting apparatus from the, now mounted connector components, leaving the mounted connector components in place on their respective structural parts.

\* \* \* \* \*